(12) United States Patent
Venugopal et al.

(10) Patent No.: US 11,770,870 B2
(45) Date of Patent: Sep. 26, 2023

(54) METHODS AND APPARATUS RELATED TO BEAM RECOVERY IN THE SECONDARY CELL

(71) Applicant: QUALCOMM Incorporated, San Diego, CA (US)

(72) Inventors: Kiran Venugopal, Raritan, NJ (US); Tianyang Bai, Bridgewater, NJ (US); Jung Ho Ryu, Fort Lee, NJ (US); Makesh Pravin John Wilson, San Diego, CA (US); Xiaoxia Zhang, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/415,133

(22) Filed: May 17, 2019

(65) Prior Publication Data

US 2020/0029383 A1    Jan. 23, 2020

Related U.S. Application Data

(60) Provisional application No. 62/700,216, filed on Jul. 18, 2018, provisional application No. 62/700,308, filed on Jul. 18, 2018.

(51) Int. Cl.
*H04W 76/19* (2018.01)
*H04W 72/12* (2009.01)
(Continued)

(52) U.S. Cl.
CPC ........... *H04W 76/19* (2018.02); *H04W 72/21* (2023.01); *H04W 72/23* (2023.01); *H04W 74/006* (2013.01); *H04W 74/0833* (2013.01)

(58) Field of Classification Search
CPC ............. H04W 76/19; H04W 74/0833; H04W 72/1284; H04W 72/14; H04W 74/006; H04B 7/088; H04B 7/0695; H04L 5/001
See application file for complete search history.

(56) References Cited

U.S. PATENT DOCUMENTS

2018/0302917 A1\* 10/2018 John Wilson ..... H04W 72/1284
2019/0097874 A1\*  3/2019 Zhou ..................... H04W 16/28
(Continued)

OTHER PUBLICATIONS

Huawei et al., "Remaining Issue for Beam Failure Recovery", 3GPP Draft, 3GPP TSG-RAN WG2 Ad Hoc, R2-1800632 Remaining Issue for Beam Failure Recovery, 3rd Generation Partnership Project (3GPP), Mobile Competence Centre, F-06921 Sophia-Antipolis Cedex, France, vol. RAN WG2, No. Vancouver, Canada, Jan. 22, 2018-Jan. 26, 2018, Jan. 12, 2018 (Jan. 12, 2018), XP051386264, 4 Pages, Retrieved from the Internet: URL:http://www.3gpp.org/ftp/tsg%5Fran/WG2%5FRL2/TSGR2%5FAHs/2018%5F01%5FNR/Docs/ [retrieved on Jan. 12, 2018].

(Continued)

*Primary Examiner* — Samina F Choudhry
(74) *Attorney, Agent, or Firm* — ArentFox Schiff LLP

(57) ABSTRACT

Various aspects and features described herein relate to methods for beam failure recovery in a SCell with assistance from a PCell. In an aspect, an apparatus (e.g., a UE) may detect an SCell beam failure, and send a scheduling request in response to detection of the SCell beam failure to a base station via a PCell. The UE may receive a first message including one of an uplink grant or a trigger for an UL report from the base station via the PCell. The UE may send a second message via the PCell indicating the SCell beam failure and a preferred candidate beam associated with the SCell. The UE may receive CORESET TCI state activation from the base station via the PCell, and determine, based on (Continued)

the CORESET TCI state activation signal, a control channel associated with the preferred candidate beam.

25 Claims, 18 Drawing Sheets

(51) Int. Cl.
    *H04W 72/14*     (2009.01)
    *H04W 74/00*     (2009.01)
    *H04W 74/08*     (2009.01)
    *H04W 72/21*     (2023.01)
    *H04W 72/23*     (2023.01)

(56) References Cited

U.S. PATENT DOCUMENTS

| | | | |
|---|---|---|---|
| 2019/0190582 A1* | 6/2019 | Guo | H04L 5/0048 |
| 2019/0253941 A1* | 8/2019 | Cirik | H04W 36/0072 |
| 2020/0374960 A1* | 11/2020 | Deenoo | H04W 72/14 |
| 2021/0021321 A1* | 1/2021 | Liu | H04B 7/088 |
| 2021/0058998 A1* | 2/2021 | Yuan | H04W 72/0413 |

OTHER PUBLICATIONS

International Search Report and Written Opinion—PCT/US2019/034346—ISA/EPO—dated Oct. 28, 2019.

Samsung: "MAC Impacts: Beam Failure Recovery for SCell", 3GPP Draft, 3GPP TSG-RAN2 101bis, R2-1804303 MAC Impacts Beam Failure Recovery for SCell, 3rd Generation Partnership Project (3GPP), Mobile Competence Centre, 650, Route Des Lucioles, F-06921 Sophia-Antipolis Cedex, France, vol. RAN WG2, No. Sanya, China, Apr. 16, 2018- Apr. 20, 2018, Apr. 14, 2018 (Apr. 14, 2018), XP051428053, 8 Pages, Retrieved from the Internet: URL:http://www.3gpp.org/ftp/Meetings%5F3GPP%5FSYNC/RAN2/Docs/ [retrieved on Apr. 14, 2018].

Partial International Search Report—PCT/US2019/034346—ISA/EPO—dated Sep. 4, 2019.

QUALCOMM: "Beam Failure Recovery Procedure", 3GPP Draft; 3GPP TSG RAN WG2 #92b, R1-1804788 Bfrprocedure, 3rd Generation Partnership-Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427055, 10 pages, Retrieved from the Internet: URL::http://www.3gpp.org/ftp/Meetings%5F3GPP%5FSYNC/RAN1/Docs/ [retrieved on Apr. 15, 2018], 10 pages.

\* cited by examiner

METHODS AND APPARATUS RELATED TO BEAM RECOVERY IN THE SECONDARY CELL

CROSS REFERENCE TO RELATED APPLICATION(S)

This application claims the benefit of U.S. Provisional Patent Application Ser. No. 62/700,216, entitled "Methods and Apparatus Related to Beam Recovery in the Secondary Cell," and filed on Jul. 18, 2018, and U.S. Provisional Patent Application Ser. No. 62/700,308, entitled "Methods and Apparatus Related to Beam Recovery in the Secondary Cell," and filed on Jul. 18, 2018, which are both expressly incorporated by reference herein in their entireties.

BACKGROUND

Technical Field

The present disclosure relates generally to communication systems, and more particularly, to methods and apparatus related to beam recovery.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects and features described herein relate to methods for beam failure recovery in a SCell with assistance from a PCell in a communication system that supports PCell and SCell carrier aggregation operations. In an aspect of the disclosure, a method, a computer-readable medium, and an apparatus are provided. The apparatus may be a user equipment (UE). The apparatus may be configured to detect an SCell beam failure. The apparatus may be further configured to send, to a base station via a PCell, a scheduling request (SR) in response to detection of the SCell beam failure. The apparatus may be further configured to receive, from the base station via the PCell, a first message including one of an uplink (UL) grant or a trigger for an UL report. The apparatus may be further configured to send a second message, to the base station via the PCell, comprising information indicating the SCell beam failure.

In another aspect of the disclosure, a method, a computer-readable medium, and an apparatus are provided. The apparatus may be a UE configured to detect an SCell beam failure. The apparatus may be further configured to send, to a base station via a PCell, a SR comprising information indicating the SCell beam failure. The apparatus may be further configured to receive in response to the SR, from the base station via the PCell, a physical downlink control channel (PDCCH) order indicating a set of resources associated with the SCell.

In another aspect of the disclosure, a method, a computer-readable medium, and an apparatus are provided. The apparatus may be a base station. The apparatus may be configured to receive, via a primary cell (PCell), a scheduling request (SR) from a user equipment (UE) based on detection of a secondary cell (SCell) beam failure at the UE. The apparatus may be further configured to transmit, from the PCell, a first message to the UE including one of an uplink (UL) grant or a trigger for an UL report. The apparatus may be further configured to receive, at the PCell, a second message from the UE comprising information indicating the SCell beam failure.

In another aspect of the disclosure, a method, a computer-readable medium, and an apparatus are provided. The apparatus may be a base station. The apparatus may be configured to receive, via a primary cell (PCell), a scheduling request (SR) from a user equipment (UE) comprising information indicating a secondary cell (SCell) beam failure. The apparatus may be further configured to transmit, from the PCell, in response to the SR, a physical downlink control channel (PDCCH) order indicating a set of resources associated with the SCell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
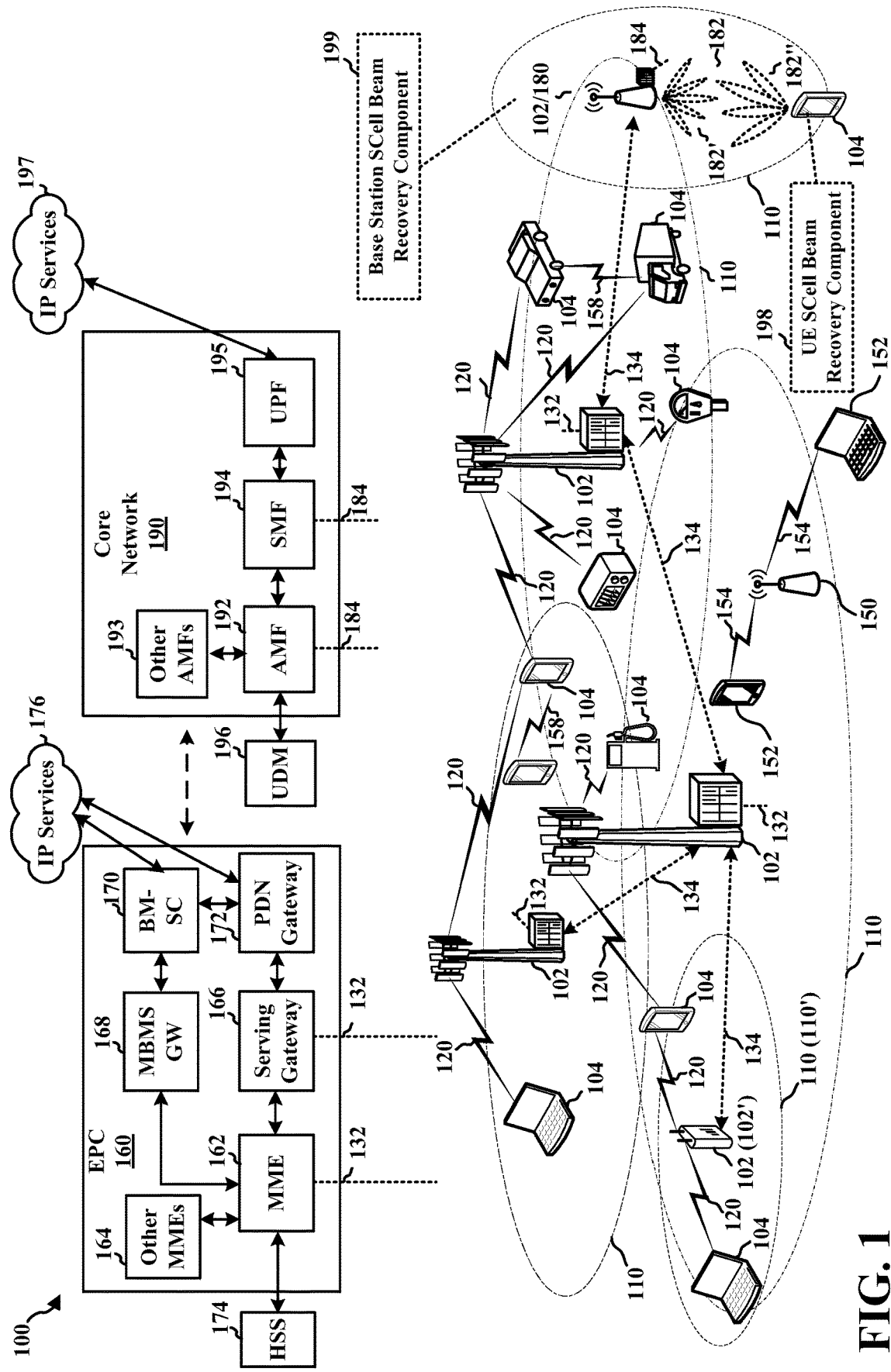
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory" and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the base station 102/180 may be configured to manage one or more aspects of wireless communication via performing beam failure recovery processes in the SCell with assistance from the PCell. For example, the UE 104 may include a UE SCell beam recovery component 198 configured to detect a secondary cell (SCell) beam failure, send, to a base station via a primary cell (PCell), a scheduling request (SR) in response to detection of the SCell beam failure, receive, from the base station via the PCell, a first message including one of an uplink (UL) grant or a trigger for an UL report, and send a second message, to the base station via the PCell, comprising information indicating the SCell beam failure. The base station 102/180 may include a base station SCell beam recovery component 199 configured to receive the SR from the UE via the SCell and to transmit a message comprising an UL grant trigger or a trigger for an UL report.

Although the following description may provide examples based on downlink communications, it should be appreciated that the concepts described herein may be applicable to uplink communications and/or sidelink communications. Furthermore, although the following description may be focused on 5G/NR, the concepts described herein may be applicable to other similar areas, such as LTE, LTE-A, CDMA, GSM, and/or other wireless technologies, in which a WUS resource may conflict with a dedicated resource associated with the UE or a system resource (e.g., a shared resource) associated with a plurality of UEs.

Figure 2:
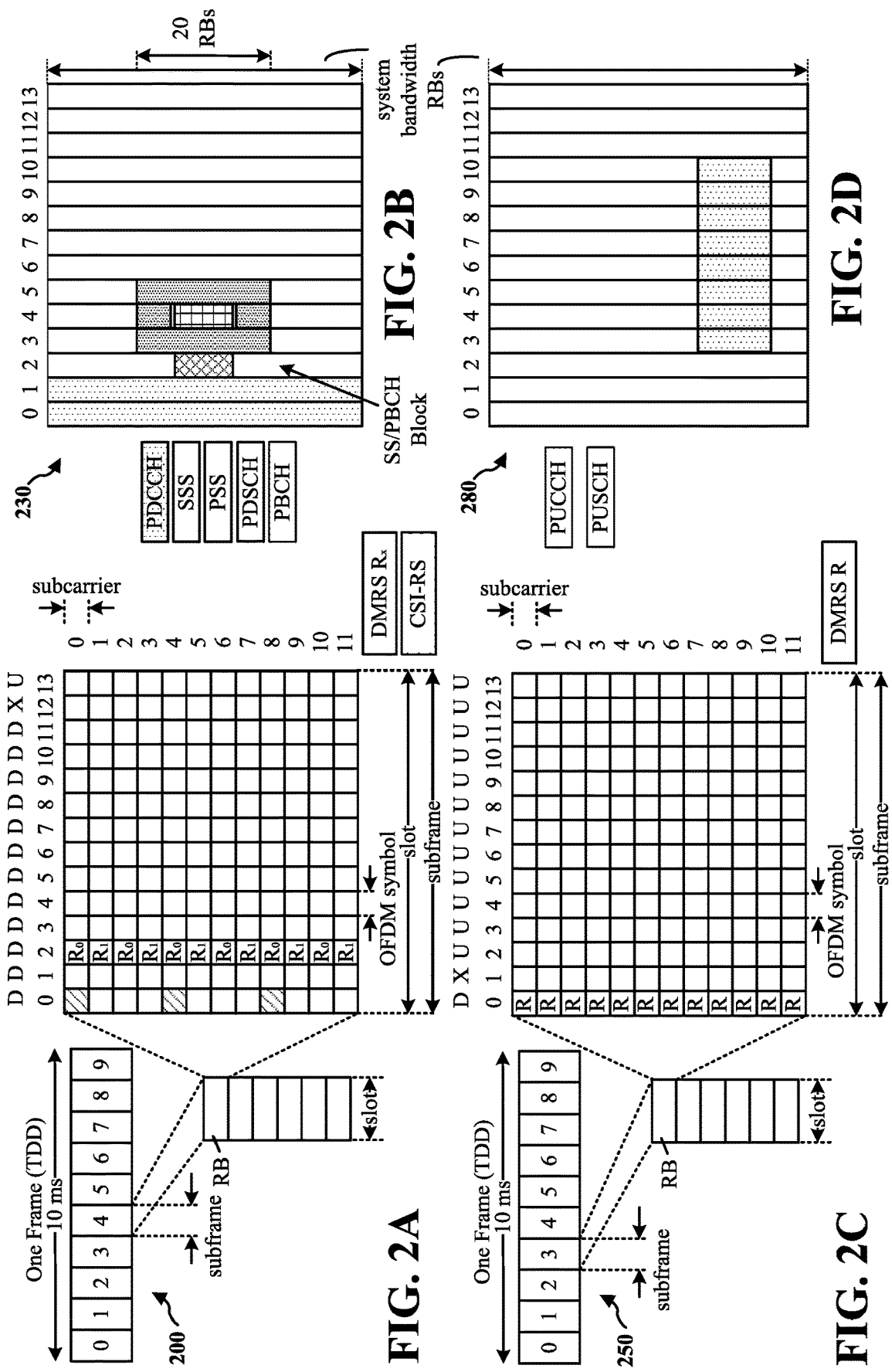
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
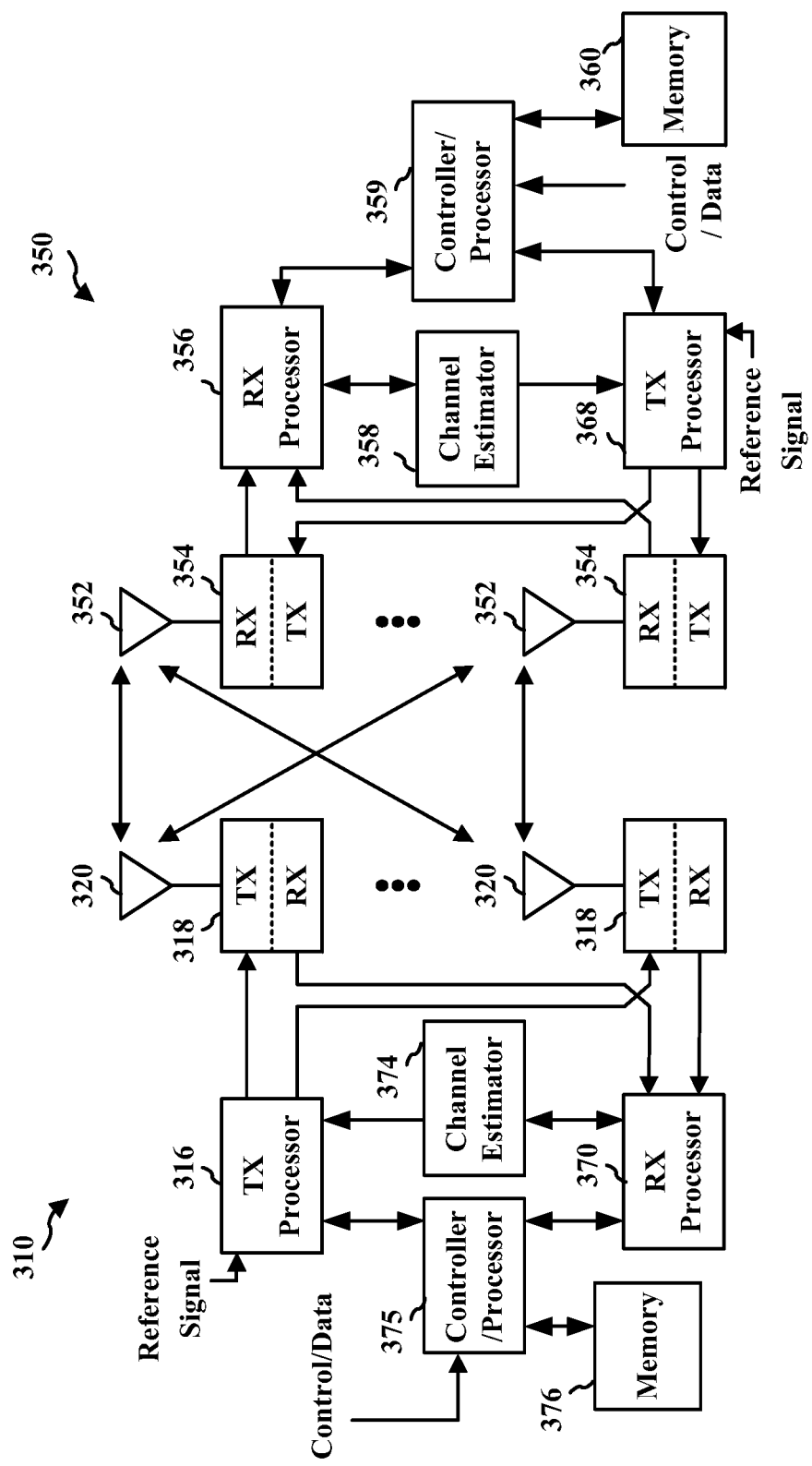
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and/or the controller/processor 375 of the base station 310 may be configured to perform aspects described in connection with the base station SCell beam recovery component 199 in FIG. 1.

At least one of the RX processor 356, the TX processor 368, and/or the controller/processor 359 of the UE 350 may be configured to perform aspects described in connection with the UE SCell beam recovery component 198 in FIG. 1.

Figure 4:
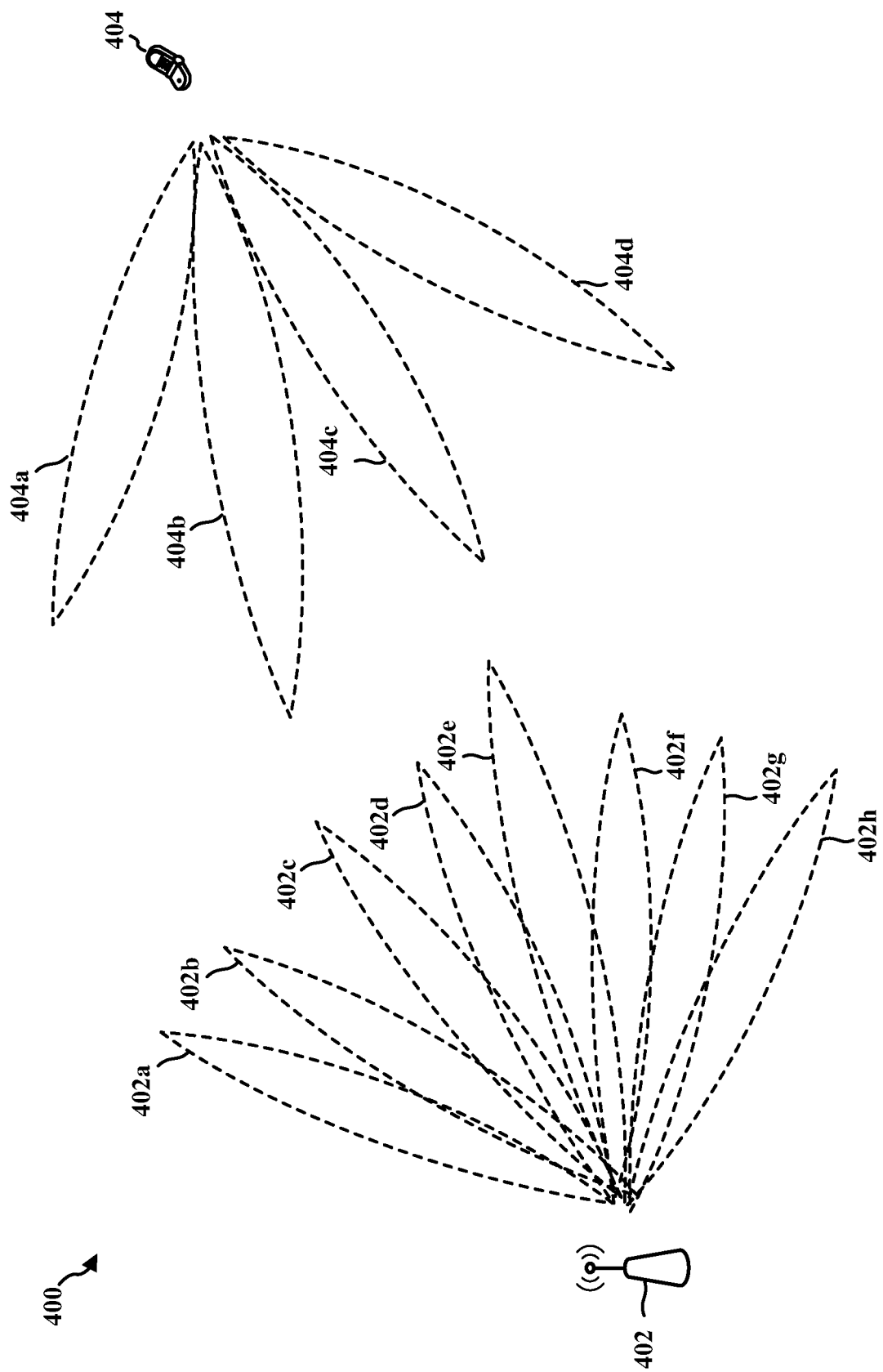
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Some wireless networks such as the 5$^{th}$ generation cellular networks may employ millimeter Wave (mmWave or mmW) frequencies to increase the network capacity. The use of mmWave frequencies may be in addition to microwave frequencies (e.g., in the sub-6 GHz band) that may also be supported for use in communication, e.g., when carrier aggregation is utilized. However, the communication at high mmWave frequencies may require directionality (e.g., communication via directional beams) to compensate for higher propagation loss. A base station and/or a UE may need to align their beams during both initial access and data transmissions to ensure maximum gain. The base station and/or the UE may determine the best beams for communicating with each other, and the subsequent communications between the base station and the UE may be via the selected beams. However due to UE mobility/movement, beam reconfiguration at the base station and/or other factors, at times a downlink beam (e.g., comprising a downlink control link), which may have been the preferred active beam until recently, may fail to be detected at the UE or the signal quality may become below a threshold causing the UE to consider it as a beam/link failure.

A beam recovery procedure may be employed to recover from a control link failure. The control link failure may refer to, for example, failure to detect a strong (e.g., with signal power greater than a threshold) active beam corresponding to a control channel communicating a control information from the network. In certain aspects, in order to facilitate beam failure detection, the UE may be preconfigured with beam IDs of a first set of beams (also referred to as setq_0) to be monitored, a monitoring period, a reference signal received power (RSRP) threshold, etc. The recovery may be triggered when, for example, a RSRP associated with the one or more monitored beams (as detected by the UE) falls below a threshold. The recovery process may include the UE identifying a new beam, e.g., from a second set of possible beams (corresponding to which beam IDs may be included in a second set referred to as setq_1), and performing a RACH procedure using preconfigured time and frequency resources corresponding to the new preferred beam. The beam IDs corresponding to the beams in the second set of beams (setq_1) may be preconfigured in the UE for use in beam failure recovery purposes. For example, the UE may monitor downlink beams (based on the beam IDs and resources identified in the second set), perform measurements, and determine (e.g., based on the measurements)

which beam out of all received and measured beams may be the best for reception at the UE from the UE perspective. If beam correspondence is assumed (e.g., best receive beam direction is also considered the best transmit beam direction), then the UE may assume the same beam configuration for both reception and transmission. In other cases where beam correspondence is not assumed (e.g., deemed not suitable in the given scenario or other reasons), the UE may perform a RACH procedure (e.g., using the preconfigured time and frequency resources indicated in the second set) for identifying the uplink beam. Performing the RACH procedure using the preconfigured time and frequency resources may comprise, e.g., transmitting a RACH preamble on one or more beams (corresponding to the beam IDs in the second set) on allocated RACH resources corresponding to the one or more beams. Based on the RACH procedure, the UE may be able to determine and confirm with the base station which uplink direction may be the best beam direction for an uplink channel (e.g., PUCCH). In this manner, both uplink and downlink beams may be reestablished and beam recovery may be completed.

In certain aspects, carrier aggregation may be utilized where the communication between the base station and the UE may be supported via multiple carrier components (e.g., PCell and SCell). For example, PCell may correspond to a microwave frequency band and/or other relatively lower frequency bands than the mmW frequency band, while the SCell may correspond to the mmW frequency band. In an aspect, when PCell and SCell operation is supported by the communication system, assistance from the PCell may be leveraged to enhance an SCell recovery procedure. In other words, if the beam/link failure occurs in the SCell, assistance from the PCell may be leveraged to facilitate an SCell beam recovery procedure. Such an approach may reduce the delays and latencies associated with the beam recovery procedure and/or allow for faster recovery of a failed link in the SCell.

Various techniques and aspects for SCell recovery aided by PCell are described herein. For example, consider FR1 (PCell)+FR2 (SCell) operation as illustrated in various figures and discussed infra, where FR1 may correspond to a sub 6 GHz band and FR2 may correspond to a mmWave band. In the examples illustrated in FIGS. 5 to 9 and discussed below, for simplicity, the PCell and the SCell are shown to be associated with a base station 502 (e.g., the hardware/circuitry for implementing PCell and SCell may be collocated at the base station 502). However, in some other configurations, the PCell and the SCell may be associated with different base stations that may be synchronized.

Figure 5:
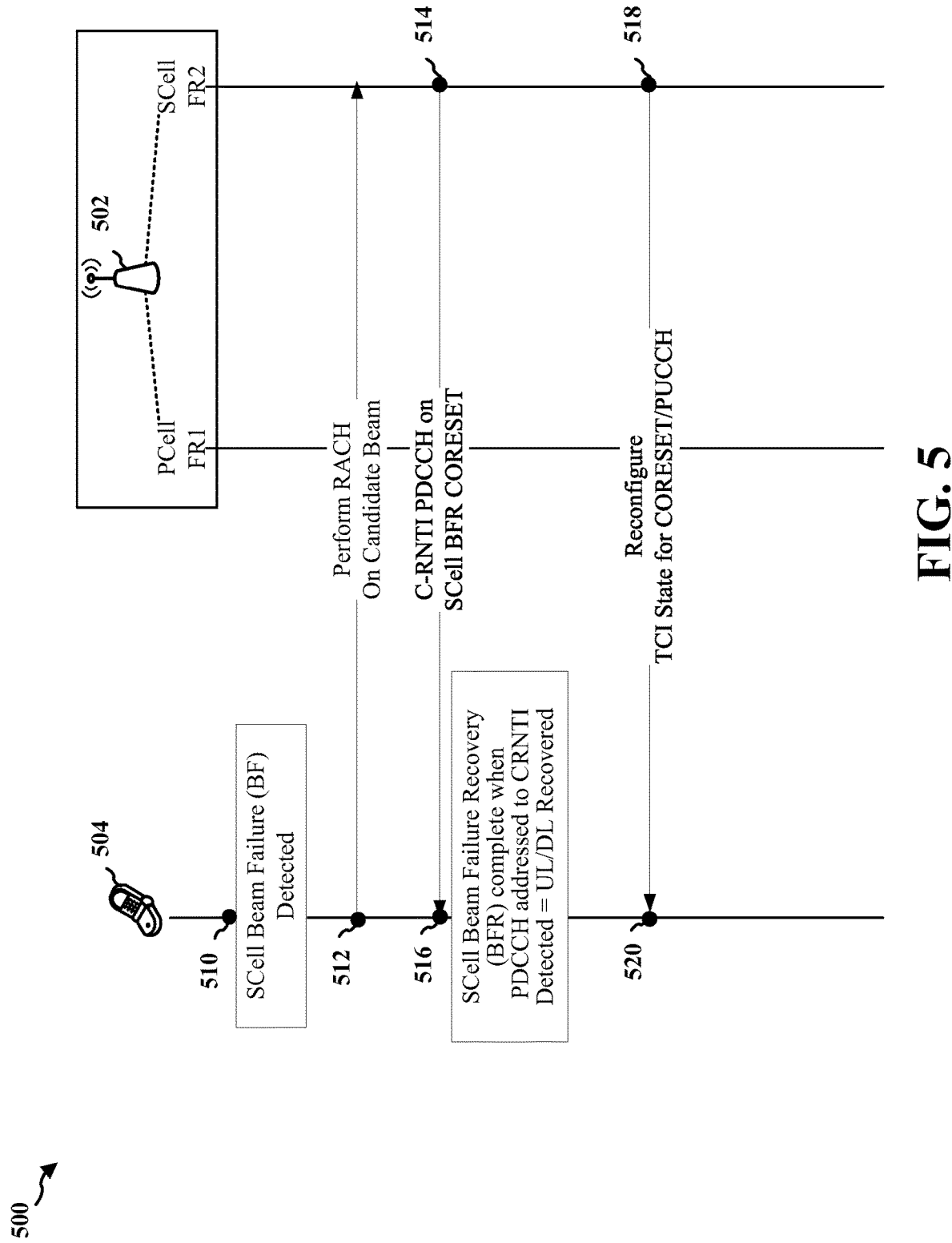
FIG. 5 illustrates an example of a standalone SCell beam recovery procedure, in accordance with one aspect.

FIG. 5 illustrates a diagram 500 showing an example of a standalone SCell beam recovery procedure, in accordance with one aspect. The beam recovery procedure shown in the example of FIG. 5 may be considered a baseline standalone beam recovery procedure where the beam recovery is performed without assistance from the PCell.

At 510, the UE 504 may detect an SCell beam failure. For example, the UE 504 may detect an SCell beam failure occurs when one or more preferred beams (in the SCell/FR2 band) via which the UE 504 may be communicating with the base station 502 fail to be detected at the UE 504 and/or the quality metric associated with signals received via the one or more beams fall below a threshold. For example, when the RSRP associated with the one or more monitored beams in the SCell falls below a threshold (e.g., a preconfigured threshold value), the UE 504 may consider that as an SCell beam failure. In an aspect, a beam recovery procedure may be triggered upon the UE 504 detecting the SCell beam failure.

At 512, the UE 504 may perform a RACH procedure on a candidate beam. As discussed supra, the beam IDs corresponding to a set of candidate beams may be preconfigured at the UE 504, and the UE 504 may perform a RACH procedure on one or more candidate beams from this set of candidate beams. Performing the RACH procedure may include the UE 504 transmitting a RACH preamble (which may be pre-stored or provided to the UE 504 by the base station 502) on one or more candidate beams on preconfigured RACH resources corresponding to the one or more candidate beams. The preconfigured RACH resources may correspond to the SCell (e.g., in the mmW band). The base station 502 may receive the PRACH preamble transmitted by the UE 504 via the candidate beams.

At 514, the base station 502 may transmit a response to the UE 504 with a Cell-Radio Network Temporary Identifier (C-RNTI) via a PDCCH associated with the SCell. For example, the response may comprise cyclic redundancy check (CRC) bits scrambled by C-RNTI. The response with C-RNTI transmitted via the SCell PDCCH may be a RACH-response that may be specifically sent in response to the RACH preamble transmission from the UE 504 for beam failure recovery.

At 516, the UE 504 may receive the response with the C-RNTI via the SCell PDCCH from the base station 502. After processing the received response and having determined that the received PDCCH is addressed to the C-RNTI, the UE 504 may determine that the beam failure recovery (BFR) procedure has completed. In accordance with one aspect, the C-RNTI may be mapped to a base station determined best beam direction for an uplink channel (e.g., PUCCH) for the UE 504. Accordingly, upon receipt of the response with C-RNTI from the base station 502, at 516, the UE 504 may be able to determine the optimal uplink beam that may be best suited for the uplink channel. Once the UE 504 detects C-RNTI PDCCH, the UE 504 may continue monitoring PDCCH candidates in the search space until the UE 504 receives a MAC-control element (MAC-CE) activation command for a transmission configuration indicator (TCI) state.

At 518, the base station 502 may transmit an activation command for TCI state illustrated as an arrow indicating "reconfigure TCI state for CORESET/PUCCH."

At 520, the UE 504 may receive the reconfigure TCI state for CORESET/PUCCH command. The command may confirm to the UE 504 that the beam direction for the PUCCH and that the PUCCH has been recovered.

In the example of FIG. 5, the SCell beam recovery procedure is completed without assistance from the PCell. While such an approach may be used in some example configurations, this approach may have some undesirable features. For example, in this approach, dedicated RACH resources may be needed on the SCell, additional overhead (e.g., due to RACH messages and signaling) may also be associated and/or an additional RACH priority rule(s) may be need to be defined to avoid collisions between PCell and SCell random access (e.g., when both the PCell and the SCell are in-band). While the dedicated RACH resources may be used by the UE 504 in the event of beam failure recovery, at other times, the dedicated resources are held up for no reason and are not usable for other purposes, which is an undesirable effect. Accordingly, it may be appreciated that a beam recovery procedure avoiding such undesirable effects may be beneficial.

Figure 6:
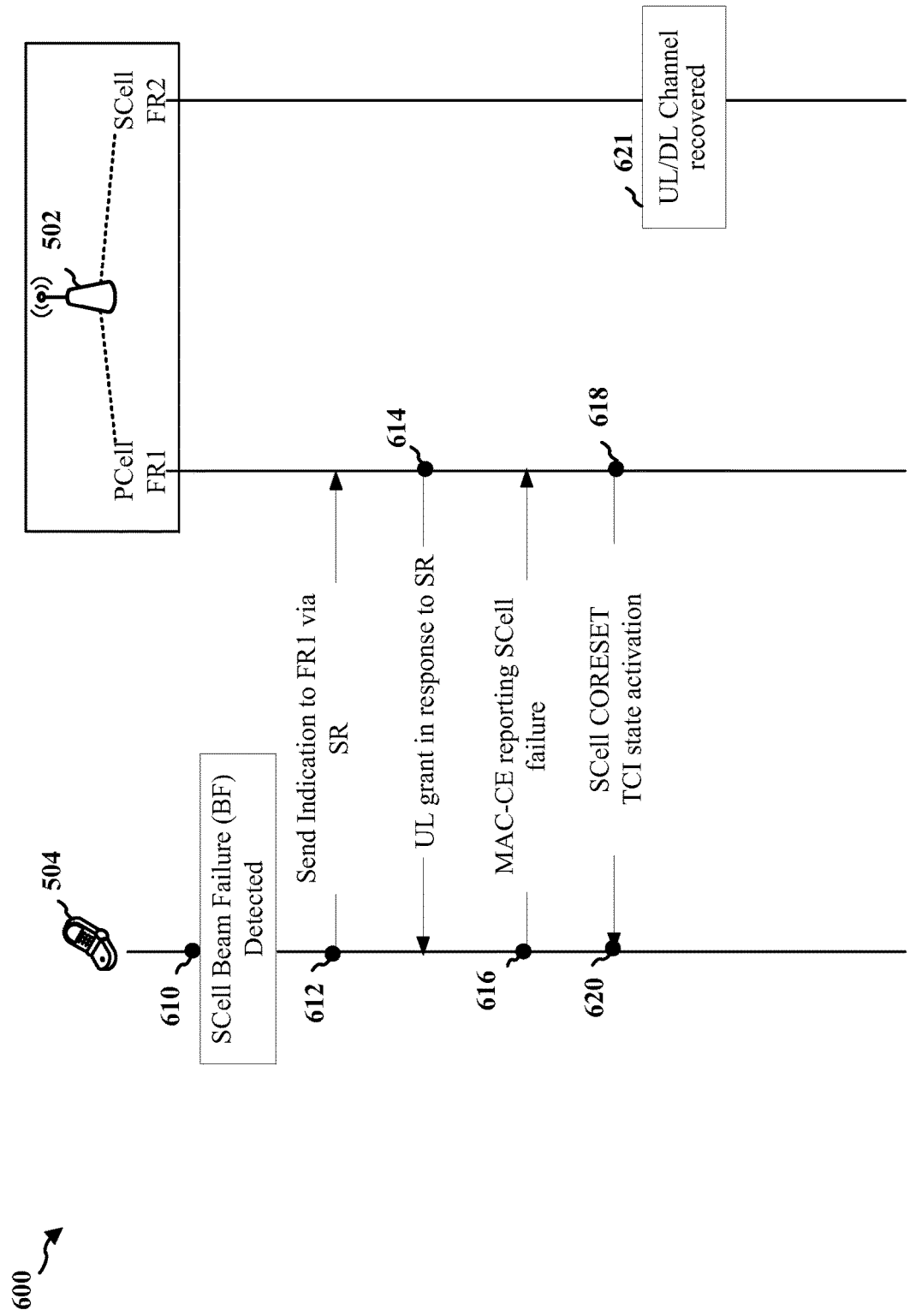
FIG. 6 illustrates an example of an SCell beam recovery procedure with PCell assistance with beam correspondence, in accordance with one aspect.

FIG. 6 illustrates a diagram 600 showing an example of an SCell beam recovery procedure with PCell assistance, in accordance with one aspect. Furthermore, for the purposes of the example of FIG. 6, beam correspondence is assumed (e.g., the best receive beam direction is also considered the best transmit beam direction).

At 610, the UE 504 may detect an SCell beam failure. The conditions for determining whether a beam failure has occurred are discussed supra and the determination at 610 may be performed in a similar manner as discussed supra in connection with block 510 of FIG. 5. Upon the detection of the SCell beam failure, a beam recovery procedure may be triggered in accordance with the features of the methods described herein.

At 612, the UE 504 may send a scheduling request (SR) via the PCell (e.g., via FR1 corresponding to a sub 6 GHz frequency band) to the base station, e.g., indicating an upcoming UL transmission.

Having received the SR from the UE 504, at 614, the base station 502 may send an UL grant over the PCell to the UE in response to the SR for use in the uplink transmission from the UE 504.

At 616, the UE 504 may send a message (e.g., a MAC-CE) reporting the detected SCell beam/link failure, e.g., based on the UL grant. In some configurations, the message reporting the detected SCell beam/link failure may further include preferred candidate beam identification information (e.g., beam ID of a preferred beam in SCell). For example, the UE 504 may be preconfigured with beam IDs for beams to be monitored for beam recovery purposes, and may periodically monitor downlink beams (e.g., communicating synchronization signal blocks (SSBs) from the base station 502 over the SCell. Based on measurements on the monitored beams, the UE 504 may identify a preferred candidate beam that may be best suited for reception at the UE 504. In such an example, the UE 504 having identified the preferred beam candidate, may send the beam ID for the preferred beam candidate to the base station 502 via the PCell, e.g., in the MAC-CE.

The base station 502 may receive the message over the PCell from the UE 504 and may activate an uplink/downlink channel for communications with the UE 504 over the SCell. The uplink/downlink channel may be associated with the direction of the preferred candidate beam.

At 618, the base station 502 may send an SCell control resource set (CORESET) TCI state activation signal to the UE 504. The CORESET TCI state activation signal may indicate resources, for a control channel associated with the preferred candidate beam, that have been activated by the base station.

At 620, the UE 504 may receive the CORESET TCI state activation signal and determine, based on the CORESET TCI state activation signal, that the control channel associated with the preferred candidate beam in the SCell has been configured and resources for the control channel have been activated. Accordingly, the UE 504 may consider that a control channel/link in the preferred beam direction has been established (as indicated at 621) and thus beam recovery procedure has been successfully completed. As beam correspondence is assumed in the example process illustrated in FIG. 6, the beam direction over which downlink transmissions over the SCell are received by the UE 504 may be used for uplink transmissions over the SCell. In one aspect, the established SCell control channel may be used as both a downlink channel as well as an uplink channel (e.g., at different points in time).

In one example configuration, as an alternative to the operations discussed at 614, instead of the UL grant, an UL report may be triggered via a DCI from the base station. For example, in response to the SR from the UE 504, the base station 502 may send a DCI, where the DCI may request transmission of an uplink report (e.g., an L1 report) via the PCell. In such an example, at 616, instead of the MAC-CE, the UE 504 may send an uplink report via the PCell.

Figure 7:
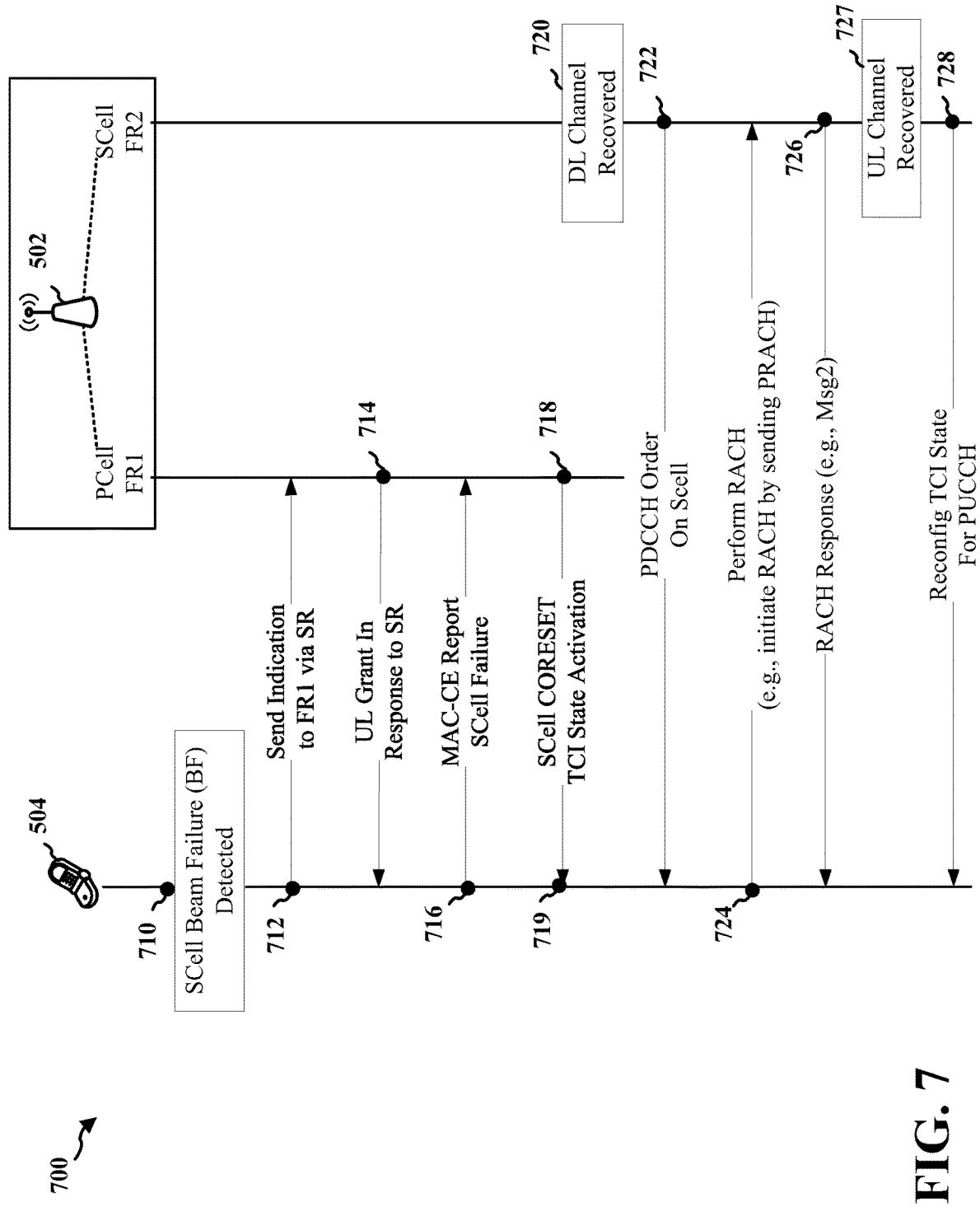
FIG. 7 illustrates an example of an SCell beam recovery procedure with PCell assistance but without assuming beam correspondence, in accordance with one aspect.

FIG. 7 illustrates a diagram 700 showing an example of an SCell beam recovery procedure with PCell assistance, but without assuming any beam correspondence, in accordance with one aspect. Thus, the initial processing illustrated in the example of FIG. 7 is similar to that shown in FIG. 6, but with some additional signaling in the later stages of the recovery process. Furthermore, for the example beam recovery procedure of FIG. 7, it is considered that beam recovery CORESET (control resource set for beam recovery in SCell) may not be activated unless needed, and, thus, the beam recovery resources may not be blocked from being used by the base station 502 for other purposes. Thus, the example beam recovery procedure of FIG. 7 may facilitate on-demand activation of RACH resources for an SCell via the PCell as discussed infra.

At 710, the UE 504 may detect an SCell beam failure. Upon the detection of SCell beam failure, a beam recovery procedure may be triggered in accordance with the features of the methods described herein.

At 712, the UE 504 may send an SR via the PCell (e.g., via FR1 corresponding to a sub 6 GHz frequency band) to the base station, e.g., indicating an upcoming UL transmission.

Having received the SR from the UE 504, at 714, the base station 502 may send an UL grant over the PCell to the UE in response to the SR for use in the uplink transmission from the UE 504.

At 716, the UE 504 may send a message (e.g., a MAC-CE) reporting the detected SCell beam/link failure, e.g., using the UL grant, over the PCell. The base station 502 may receive the message over the PCell and may activate beam recovery resources corresponding to the SCell for beam recovery.

At 718, the base station 502 may send an SCell CORESET TCI state activation signal to the UE 504 indicating that control channel resources (associated with the SCell) for beam recovery have been activated. In some configurations, the SCell CORESET TCI state activation signal may indicate beam IDs and corresponding resources for monitoring beams from the base station 502 over the SCell, e.g., for beam failure recovery operation. In various configurations, based on the beam IDs and corresponding resources, the UE 504 may monitor downlink signals (e.g., SSBs and/or other reference signals) via downlink beams and performed measurements to identify the best downlink beam direction. Based on the measurements, the UE 504 may identify a preferred downlink beam (or set of beams) for directional downlink channel (e.g., PDCCH). In some configurations, the UE 504 may send an indication of the selected/identified preferred downlink beam to the base station 502 via the PCell so that the base station 502 may configure a PDCCH for the UE 504 in the SCell in the preferred downlink beam direction. In some configurations, upon activation of the SCell CORESET, downlink channel(s) associated with the SCell may be considered as having been recovered as indicated in block 720.

In accordance with one aspect, at 722, the base station 502 may send a PDCCH order on the SCell. A PDCCH order may be defined as a mechanism by which the base station 502 may force, e.g., instruct/command, the UE 504 to initiate a RACH procedure. In the given example of FIG. 7, the base station 502 may send a PDCCH order to the UE 504 in order to initiate RACH for beam failure recovery. In some configurations, the PDCCH order may include information indicating a set of resources associated with the SCell for performing RACH, one or more RACH preamble indices, one or more beams IDs corresponding to candidate beams for transmitting a RACH preamble, etc. The set of resources associated with the SCell may include resources for transmitting RACH preamble via different the various candidate beams.

At 724, the UE 504 may initiate the RACH procedure. For example, initiating the RACH procedure may include the UE 504 transmitting a RACH preamble via various candidate beams on corresponding resources (e.g., time frequency resources indicated in the PDCCH order) in the SCell. In one example, the candidate beams via which the RACH preamble is transmitted may include the various beams identified by the beam IDs indicated in the PDCCH order. In one example, the candidate beams via which the RACH preamble is transmitted may include one or more beams that may have been identified by the UE 504 as preferred candidate beams based on downlink signals measurements corresponding to signals (e.g., SSBs) received via these beams at an earlier point in time.

At 726, the base station 502 may transmit a RACH response (e.g., Msg 2) to the UE 504 over the SCell. In some configurations, the RACH response may include a time advance value and/or other additional information for the UE 504 to be uplink in-sync.

The RACH response at 726 may be transmitted in response to the RACH preamble that was transmitted in a beam direction that may be best suited for the base station 502 for uplink reception purposes. For example, the base station 502 may receive a RACH preamble transmitted by the UE 504 via five beams on their corresponding resources in the SCell. Out of these five beams, the base station 502 may determine which one beam is the best beam for uplink from the perspective of the base station 502. The base station 502 may establish an uplink channel (e.g., PUCCH) on the resources (corresponding to the SCell) that corresponds to the determined best beam (it should be appreciated that there exists a one-to-one mapping between beam directions and resources on which the beam is transmitted). This is indicated as the recovery of the uplink channel (e.g., PUCCH) in the SCell, as indicated in block 727.

At 728, the base station 502 may transmit, over the SCell, a command for reconfiguring TCI state for the PUCCH. The command for reconfiguring TCI state may confirm to the UE 504 that the PUCCH has been recovered.

While not explicitly shown in the diagram 700, the RACH procedure may involve further signaling (e.g., such as Msg3 and Msg4) between the UE 504 and the base station 502.

Figure 8:
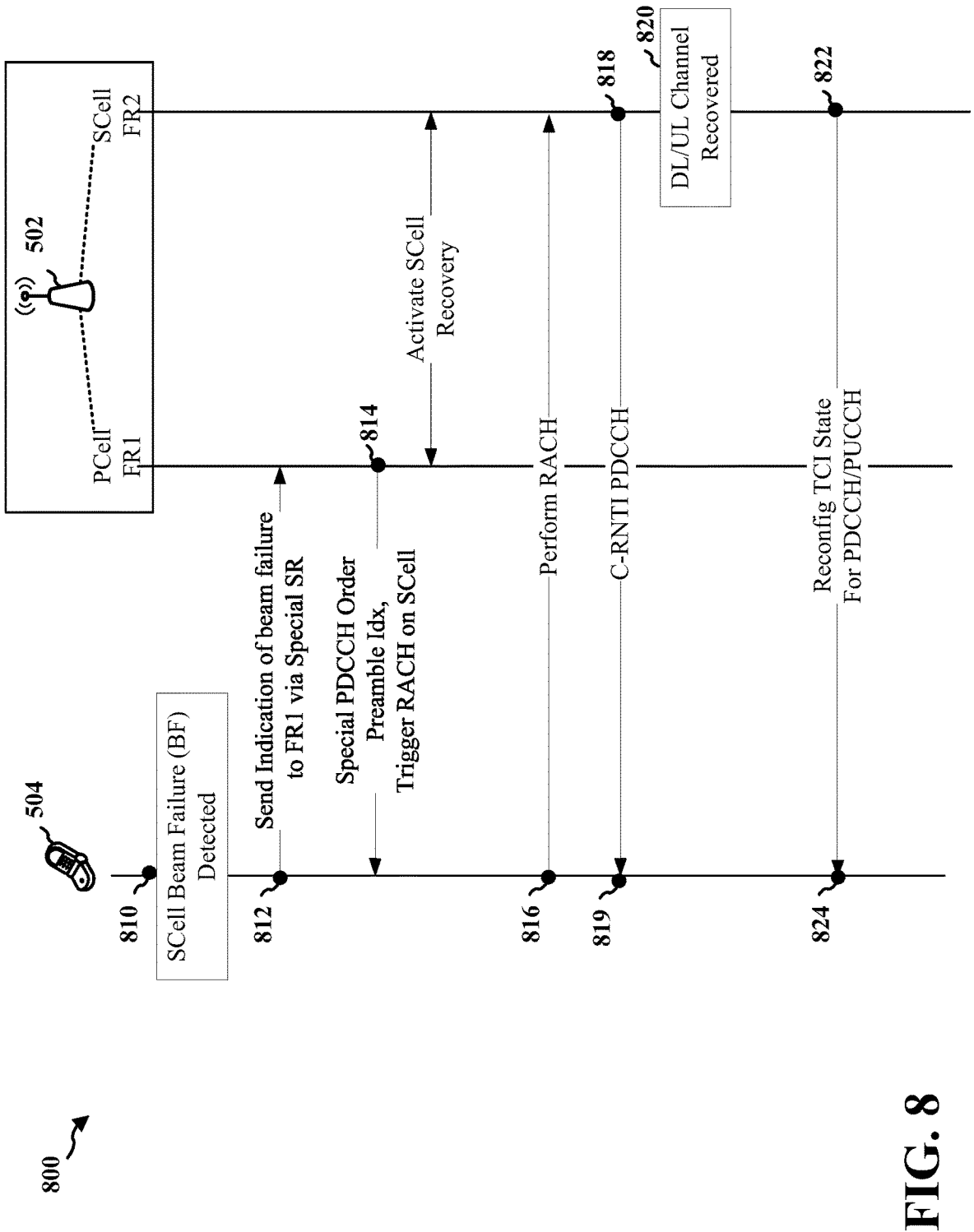
FIG. 8 illustrates another example of an SCell beam recovery procedure with PCell assistance, in accordance with one aspect.

FIG. 8 illustrates a diagram 800 showing another example of an SCell beam recovery procedure with PCell assistance, in accordance with one aspect. The example beam recovery process illustrated in FIG. 8 follows a similar mechanism as the example process shown in FIG. 7, but in the example process of FIG. 8, there is no need for UL grant, MAC-CE signaling, etc. Rather, as illustrated in the example process of FIG. 8, in accordance with one aspect, the base station 502 may issue a special PDCCH order to trigger RACH procedure initiation for beam recovery as discussed infra.

At 810, the UE 504 may detect an SCell beam failure. Upon the detection of SCell beam failure, a beam recovery procedure may be triggered.

At 812, the UE 504 may send a special SR via the PCell (e.g., via FR1 corresponding to the sub 6 GHz frequency band) to the base station 502. The scheduling request in this example is referred to as the special SR because the SR is specifically configured for SCell beam failure recovery procedure. The special SR may indicate that the SCell beam failure has occurred.

At 814, in response to receiving the special SR, the base station 502 may transmit a specialized PDCCH order, e.g., a specially configured message transmitted via the PCell to trigger RACH procedure on SCell for beam failure recovery. In some configurations, the special PDCCH order may include, for example, information indicating a set of resources associated with the SCell for performing RACH, one or more RACH preamble indices, one or more beams IDs corresponding to candidate beams for transmitting a RACH preamble, etc. The set of resources associated with the SCell beam recovery may include resources (e.g., in the frequency band corresponding to SCell/FR2) for transmitting RACH preamble via various candidate beams.

In various configurations, based on the beam IDs and corresponding resources, the UE 504 may monitor downlink signals (e.g., SSBs and/or other reference signals) via downlink beams and perform measurements to identify the best downlink beam direction. Based on the measurements, the UE 504 may identify a preferred downlink beam (or set of beams) for directional downlink channel (e.g., PDCCH). In some configurations, the UE 504 may send an indication of the selected/identified preferred downlink beam to the base station 502 via the PCell so that the base station 502 may configure a PDCCH for the UE 504 in the SCell in the preferred downlink beam direction.

At 816, the UE 504 may initiate the RACH procedure. For example, initiating the RACH procedure may include the UE 504 transmitting (over the SCell) a RACH preamble via various candidate beams on corresponding resources (e.g., time frequency resources indicated in the PDCCH order). In one example, the candidate beams via which the RACH preamble is transmitted may include the various beams identified by the beam IDs indicated in the PDCCH order. In one example, the candidate beams via which the RACH preamble is transmitted may include one or more beams that may have been identified by the UE 504 as preferred candidate beams based on downlink signals measurements corresponding to signals (e.g., SSBs) received via these beams at an earlier point in time.

The base station 502 may receive RACH preambles transmitted by the UE 504 via various candidate beams on their corresponding resources in the SCell. Out of these, the base station 502 may determine which one is the best beam for uplink from the perspective of the base station 502. Having determined the best uplink beam for the UE 504, at 818, the base station 502 may transmit a PDCCH (in the SCell) to the UE 504 with a C-RNTI. The response with C-RNTI transmitted via the SCell PDCCH may be a RACH-response that may be specifically sent in response to the RACH preamble transmission from the UE 504 for beam failure recovery. In accordance with one aspect, the C-RNTI may be mapped to the determined best beam for an uplink channel (e.g., PUCCH) for the UE 504. Accordingly, upon receipt of the response with C-RNTI from the base station 502, at 819, the UE 504 may be able to determine the optimal uplink beam that may be best suited for the uplink channel.

The base station 502 may establish the uplink channel (e.g., PUCCH) on the resources (corresponding to the SCell) that corresponds to the determined best beam. This is indicated as the recovery of the uplink channel (e.g., PUCCH) in the SCell, as indicated by block 820. Based on the resource information received in the PDCCH order earlier, the UE 504 may already be aware of the resources corresponding to the optimal uplink beam and, thus, may know the uplink channel (PUCCH) that the UE 504 is to use for transmitting uplink control information.

After detecting the C-RNTI PDCCH (at 819), the UE 504 may continue monitoring PDCCH candidates in the search space until the UE 504 may detect a MAC-control element (MAC-CE) activation command for a transmission configuration indicator (TCI) state. At 822, the base station 504 may transmit (in the SCell) the activation command for TCI state, illustrated as an arrow indicating "reconfigure TCI state PDCCH/PUCCH."

At 824, the UE 504 may receive the reconfigure TCI state for PDCCH/PUCCH command from the base station 502. The command for reconfiguring TCI state may confirm to the UE 504 the preferred/optimal beam for downlink and uplink, and that the PDCCH/PUCCH have been recovered.

Figure 9:
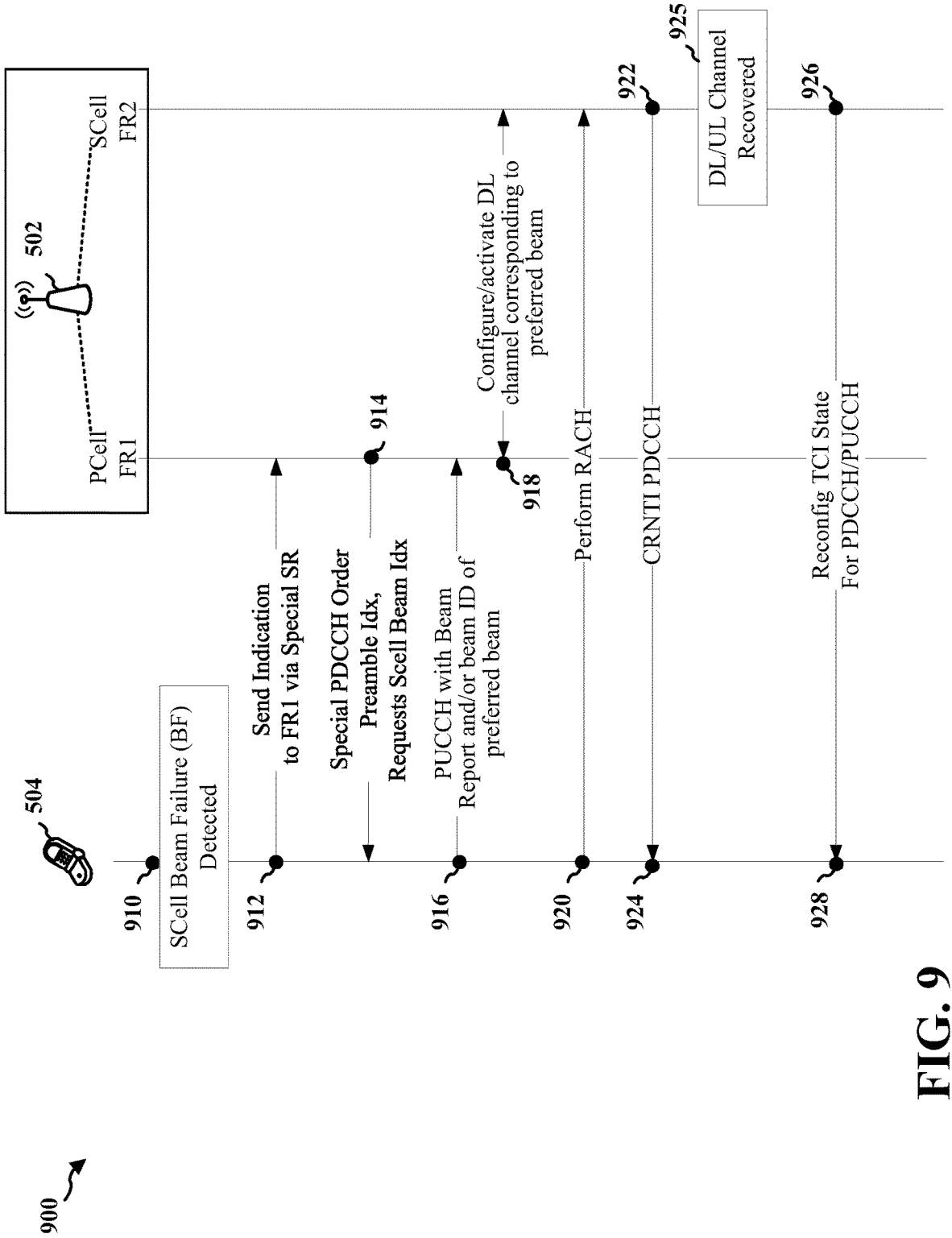
FIG. 9 illustrates yet another example of an SCell beam recovery procedure with PCell assistance, in accordance with one aspect.

FIG. 9 illustrates a diagram 900 showing yet another example of an SCell beam recovery procedure with PCell assistance, in accordance with one aspect.

At 910, the UE 504 may detect an SCell beam failure. Upon the detection of SCell beam failure, a beam recovery procedure may be triggered.

Similar to the example processing discussed supra in connection with step 812 of FIG. 8, at 912, the UE 504 may send a special SR via the PCell (e.g., via FR1 corresponding to the sub 6 GHz frequency band) to the base station 502. The scheduling request may be a specifically configured SR for SCell beam failure recovery procedure, and may provide an indication to the base station via the PCell that the SCell beam failure has occurred.

At 914, in response to receiving the special SR, the base station 502 may transmit a specialized PDCCH order, e.g., a specially configured message transmitted via the PCell to trigger a RACH procedure on SCell for beam failure recovery. Similar to the special PDCCH order discussed above in connection with the example process of FIG. 8, the special PDCCH order may include, for example, information indicating a set of resources associated with the SCell for performing RACH, one or more RACH preamble indices, one or more beams IDs corresponding to candidate beams for transmitting a RACH preamble, etc. However, in addition to the above noted parameters, the special PDCCH order in the example process of FIG. 9 further includes a request for an L1-RSRP report for SCell downlink beams and/or request for reporting a beam ID corresponding to a preferred downlink beam as determined by the UE 504.

In response to the request for L1-RSRP report for SCell downlink beams, and based on the information regarding the beam IDs and corresponding resources, the UE 504 may monitor downlink signals (e.g., SSBs and/or other reference signals) communicated via downlink beams and perform measurements to identify the best/preferred downlink beam direction. The UE 504 may generate an L1-RSRP report for the downlink beams based on the measurement. Also, based on the measurements, the UE 504 may identify a preferred downlink beam (or set of beams) for directional downlink channel (e.g., PDCCH).

At 916, the UE 504 may send the L1-RSRP report for the downlink beams and/or the beam ID corresponding to the determined preferred downlink beam, e.g., via a PUCCH in the PCell, to the base station 502. In one example, if the UE 504 sends the L1-RSRP report for the downlink beams indicating RSRP for each of the various candidate downlink beams on which measurements were performed, the base station 502 may determine identify/select a preferred downlink beam based on the received report. In another example, if the UE 504 sends the beam ID corresponding to the UE determined preferred downlink beam, the base station 502 may consider the UE determined preferred downlink beam to be the best downlink beam. In either case, based on the received report via the PUCCH in the PCell, the base station 502 may configure a downlink channel (e.g., PDCCH) for the UE 504 in the SCell corresponding to the preferred downlink beam as indicated at 918.

Next, at 920, the UE 504 may perform the RACH procedure by transmitting (over the SCell) a RACH preamble corresponding to the determined beam (e.g., a preamble ID that corresponds to or is associated with the beam ID of the determined preferred beam) on corresponding resources (e.g., time frequency resources indicated in the PDCCH order that corresponds to the beam ID of the preferred beam). In such a case, the UE 504 does not need to transmit a RACH preamble on all candidate beams and the base station 502 does not need to monitor/search for all such RACH preamble transmissions in different beams to determine the best uplink beam. Rather, as the beam ID of the preferred beam is known to the base station 502, the base station 502 may simply monitor for the given preferred beam.

At 922, the base station 502 may transmit a PDCCH (in the SCell) to the UE 504 with a C-RNTI. As discussed supra, the response with C-RNTI transmitted via the SCell PDCCH may be a RACH-response that may be specifically sent in response to the RACH preamble transmission from the UE 504 for beam failure recovery. The C-RNTI in the PDCCH may be mapped to the beam ID of the preferred beam. Accordingly, using the C-RNTI in the PDCCH, the base station 502 may indicate to the UE 504 the preferred beam for downlink and/or uplink transmissions. For example, based on the received C-RNTI in the PDCCH (at 924), the UE 504 may determine the beam ID that corresponds/maps to the C-RNTI and, thus, may ascertain the preferred beam for uplink/downlink.

The base station 502 may establish downlink and uplink channel (PDCCH/PUCCH) on the resources (corresponding to the SCell) that corresponds to the determined best beam. This is indicated as the recovery of the downlink/uplink channel in the SCell, as indicated by block 925.

At 926, the base station 504 may transmit (in the SCell) the activation command for TCI state, illustrated as an arrow indicating "reconfigure TCI state PDCCH/PUCCH."

At 928, the UE 504 may receive the reconfigure TCI state for PDCCH/PUCCH command from the base station 502. The command for reconfiguring TCI state may confirm to the UE 504 the preferred/optimal beam and that the PDCCH/PUCCH have been recovered.

While not explicitly shown in the diagrams 800 and 900 of FIGS. 8 and 9, respectively, the RACH procedure may involve further signaling (e.g., such as Msg2, Msg3 and Msg4) between the UE 504 and the base station 502.

Figure 10:
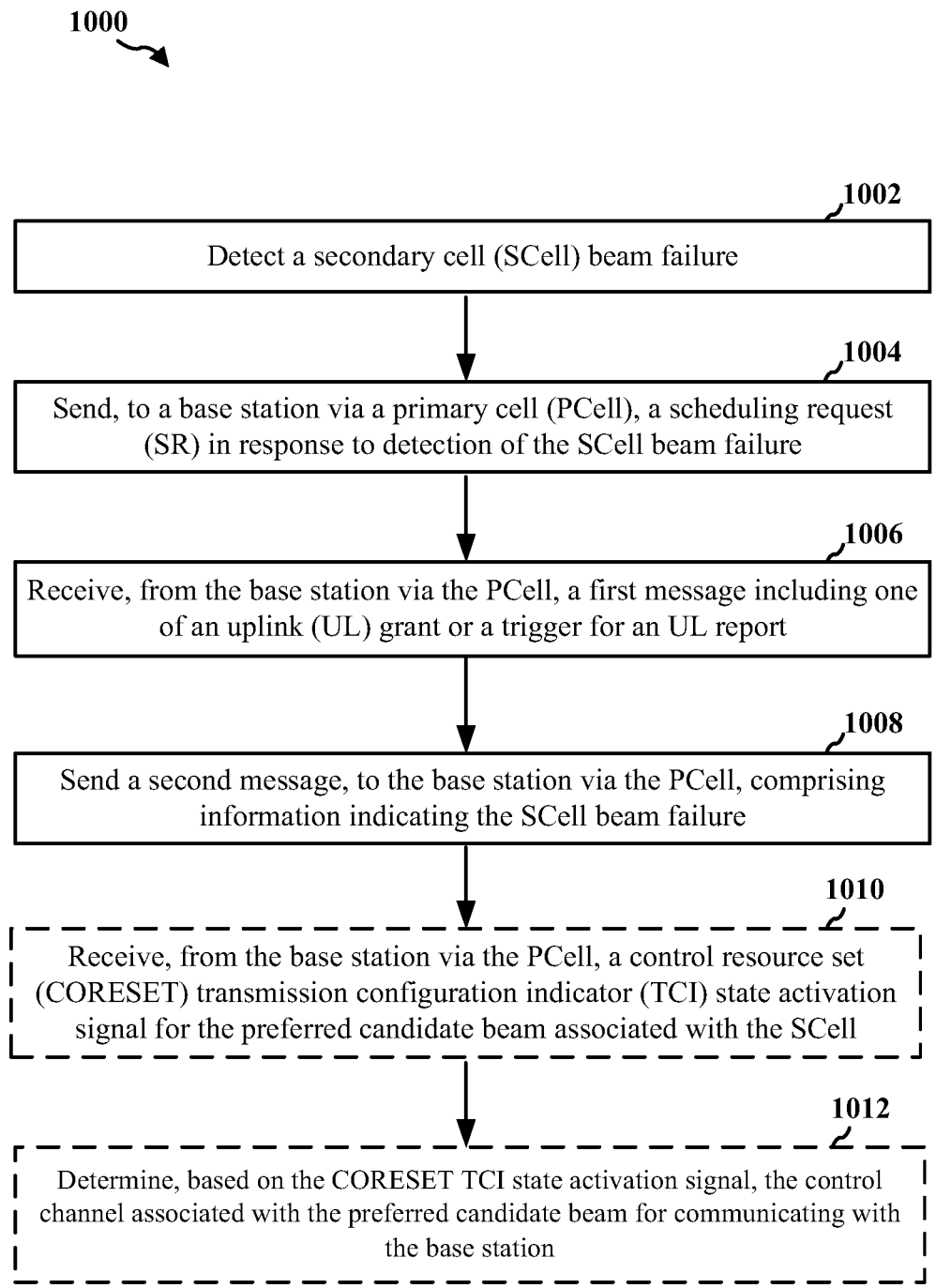
FIGS. 10 to 12 are flowcharts of example methods of wireless communication.

FIG. 10 is a flowchart 1000 of an example method of wireless communication related to SCell beam failure recovery with PCell assistance where beam correspondence is assumed. The method may be performed by a UE (e.g., the UE 104, 350, 404, 504, 1302/1302', 1750; the UE SCell beam recovery component 198; the processing system 1414, which may include memory 360 and which may be the entire UE 350 or a component of the UE 350, such as the RC processor 356, the TX processor 368, and/or the controller/ processor 359). The method may improve beam recovery procedures. Optional aspects are illustrated with a dashed line.

At 1002, the UE may detect a secondary cell (SCell) beam failure. For example, as discussed supra (e.g., in connection with FIG. 6 and elsewhere), the UE 504 may determine that RSRP corresponding to one or more beams of the SCell falls below a threshold. In some configurations, this determination may be considered an SCell beam failure. For example, beam failure determination component 1306 of apparatus 1302 may detect the SCell beam failure.

At 1004, the UE may send, to a base station via a primary cell (PCell), an SR in response to detection of the SCell beam failure. For example, as discussed supra in connection with FIG. 6, detection of an SCell beam failure may trigger a beam failure recovery process, and the UE (e.g., UE 504) may send an SR to the base station 502, as discussed with regard to 612. For example, SR component 1308 of apparatus 1302 may trigger the sending of the SR in response to the detection of the SCell beam failure.

At 1006, the UE may receive, from the base station via the PCell, a first message including one of an UL grant or a trigger for an UL report. For example, with reference to FIG. 6 example process, in response to the transmitted SR, the UE 504 may receive an UL grant from the base station 502. Alternatively, in some configurations, the UE 504 may instead receive a DCI requesting an L1 beam report (e.g., a beam report indicating RSRP for downlink beams) from the UE 504. For example, trigger component 1312 of apparatus 1302 may receive signal(s), including the first message including an UL grant or a trigger for an UL report, via the PCell.

At 1008, the UE may send a second message, to the base station via the PCell, comprising information indicating the SCell beam failure. For example, with reference to FIG. 6 example process, in response to an uplink grant, the UE 504 may send a MAC-CE to the base station 502 reporting an SCell beam failure. In another example, the UE 504 may send the requested L1 report to the base station 502. For example, beam failure reporting component 1314 of apparatus 1302 may cause the apparatus 1302 to send a message including information indicating the SCell beam failure.

In one configuration, the second message further identifies a preferred candidate beam associated with the SCell. For example, as discussed supra in connection with FIG. 6 and elsewhere, in some configurations, the UE 504 may indicate to the base station 502 an identified optimal downlink beam that is best suited (from UE perspective) for downlink reception. Considering that the second message identifies a preferred candidate beam associated with the SCell, at 1010, the UE may receive, from the base station via the PCell, an SCell CORESET TCI state activation signal corresponding to the preferred candidate beam associated with the SCell. For example, with reference to FIG. 6, the UE 504 may receive (at 620) the SCell CORESET TCI state activation signal from the base station 502 indicating that a control channel corresponding to the preferred beam has been activated on the resources corresponding to the preferred beam. The resources corresponding to the preferred beam may be preconfigured and known to the UE 504 or otherwise communicated to the UE 504 from the base station 502. For example, CORESET component 1316 of apparatus 1302 may receive the SCell CORESET TCI state activation signal.

At 1012, the UE may determine, based on the CORESET TCI state activation signal, the control channel associated with the preferred candidate beam for communicating with the base station. Assuming beam correspondence (e.g., as discussed in the example process illustrated in FIG. 6 and discussed supra), the same control channel and preferred beam may be used for both uplink and downlink control links. For example, beam determination component 1318 of apparatus 1302 may determine the control channel associated with the preferred candidate beam.

Figure 11:
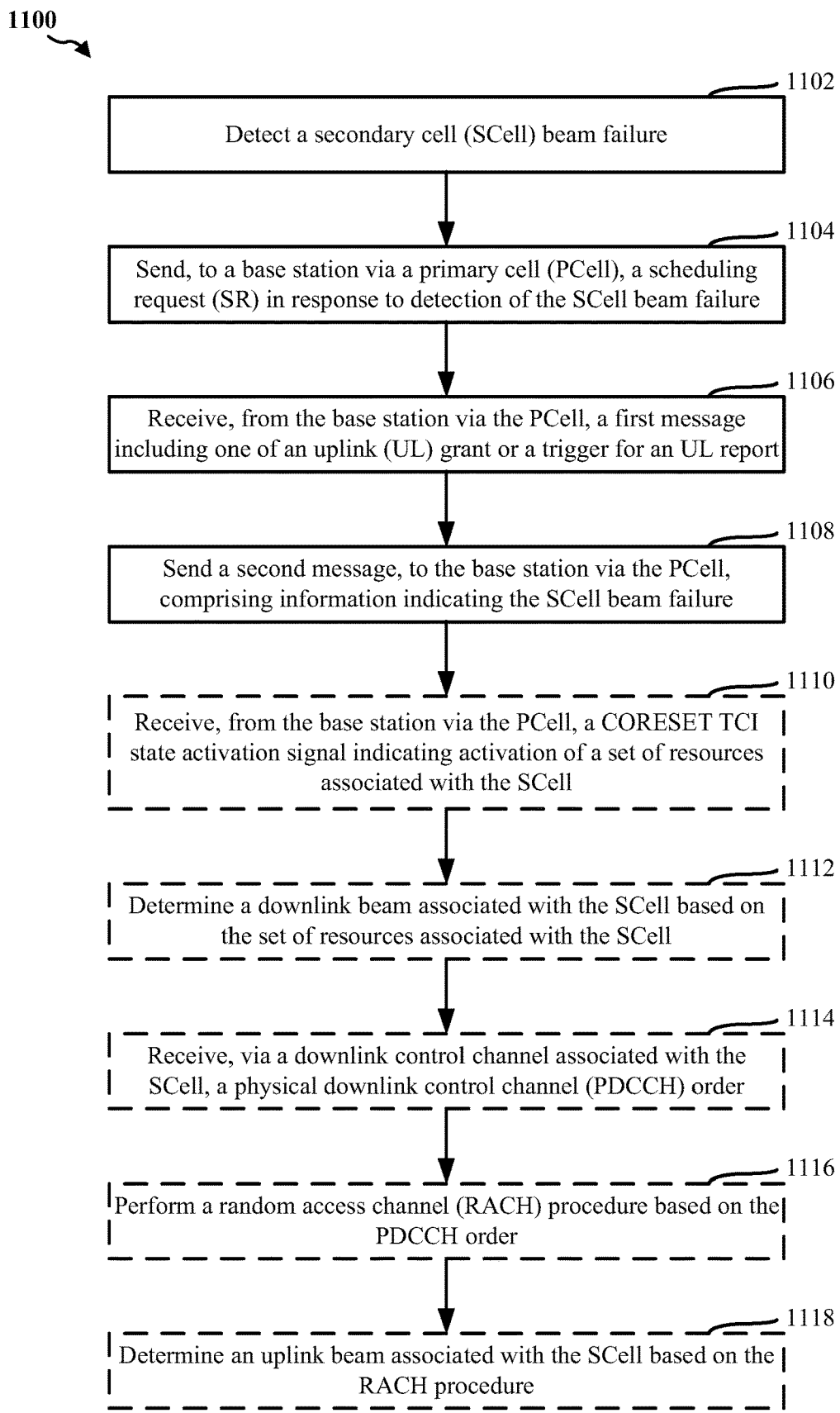

FIG. 11 is a flowchart 1100 of another example method of wireless communication related to SCell beam failure recovery with PCell assistance without assuming beam correspondence. The method may be performed by a UE (e.g., the UE 104, 350, 404, 504, 1302/1302', 1750; the UE SCell beam recovery component 198; the processing system 1414, which may include memory 360 and which may be the entire UE 350 or a component of the UE 350, such as the RC processor 356, the TX processor 368, and/or the controller/processor 359). The method may improve beam recovery procedures. Optional aspects are illustrated with a dashed line.

At 1102, the UE may detect a secondary cell (SCell) beam failure. For example, as discussed supra (e.g., in connection with FIG. 7 and elsewhere), the UE 504 may determine that RSRP corresponding to one or more beams of the SCell has fallen below a threshold. In some configurations, this determination may be considered an SCell beam failure. For example, the beam failure determination component 1306 of apparatus 1302 may detect the SCell beam failure.

At 1104, the UE may send, to a base station via a primary cell (PCell), an SR in response to detection of the SCell beam failure. For example, as discussed supra in connection with FIG. 7, detection of an SCell beam failure may trigger a beam failure recovery process, and the UE (e.g., UE 504) may send an SR to the base station 502 as discussed with regard to 712. For example, the SR component 1308 of apparatus 1302 may trigger the sending of the SR in response to the detection of the SCell beam failure.

At 1106, the UE may receive, from the base station via the PCell, a first message including one of an UL grant or a trigger for an UL report. For example, with reference to FIG. 7, in response to the transmitted SR, the UE 504 may receive an UL grant from the base station 502. For example, the trigger component 1312 of apparatus 1302 may receive signal(s), including the first message including an UL grant or a trigger for an UL report, via the PCell.

At 1108, the UE may send a second message, to the base station via the PCell, comprising information indicating the SCell beam failure. For example, with reference to the example process of FIG. 7, in response to an uplink grant, the UE 504 may send a MAC-CE to the base station 502 reporting an SCell beam failure. For example, the beam failure reporting component 1314 of apparatus 1302 may cause the apparatus 1302 to send a message including information indicating the SCell beam failure.

At 1110, the UE may receive, from the base station via the PCell, a CORESET TCI state activation signal indicating activation of a set of resources associated with the SCell. For example, with reference to FIG. 7, the UE 504 may receive (at 719) the SCell CORESET TCI state activation signal from the base station 502 indicating activation of a set of resources associated with the SCell. The CORESET TCI state activation signal may indicate the set resources associated with the SCell that may be used for monitoring/searching for downlink beams from the base station 502, beam IDs for candidate beams that may be searched/monitored, monitoring period, etc. For example, the CORESET component 1316 of apparatus 1302 may receive the SCell CORESET TCI state activation signal.

Based on the SCell CORESET TCI state activation signal, the UE may perform downlink beam measurements and identify a preferred beam (or a set of preferred beams) based on the measurements (e.g., beam with highest RSRP). At 1112, the UE may determine a downlink channel corresponding to the identified preferred downlink beam based on mapping of the corresponding resources. For example, the beam determination component 1318 of apparatus 1302 may determine the downlink channel associated with the preferred candidate beam.

At 1114, the UE may receive a PDCCH order from the base station triggering a RACH procedure, e.g., for beam failure recovery, as discussed at 722 in connection with FIG. 7. As discussed supra, the PDCCH order may indicate the preamble IDs for RACH, resources for transmitting the RACH preambles, corresponding beam IDs via which the RACH preambles may be transmitted, etc. For example, PDCCH component 1320 of apparatus 1302 may receive the PDCCH order.

At 1116, the UE may perform a RACH procedure based on the PDCCH order. For example, with reference to FIG. 7, the UE 504 may initiate the RACH procedure by transmitting (at 724) a RACH preamble via a candidate beam. The UE 504 may transmit RACH preambles via various beams based on the PDCCH order. For example, RACH component 1322 of apparatus 1302 may perform the RACH procedure.

As discussed supra, the base station 502 may search for beam transmissions from the UE 504 carrying the RACH preamble and identify a best uplink beam. The base station may then transmit a message, e.g., a RACH response, to the UE 504 including information indicating the identified best beam (for example as a C-RNTI PDCCH in the SCell).

At 1118, the UE may determine an uplink beam associated with the SCell based on the RACH procedure. For example, with reference to FIG. 7, the UE 504 may determine the optimal uplink beam associated with the SCell based on the RACH response from the base station 502. For example, the beam determination component 1318 may determine the uplink beam.

Figure 12:
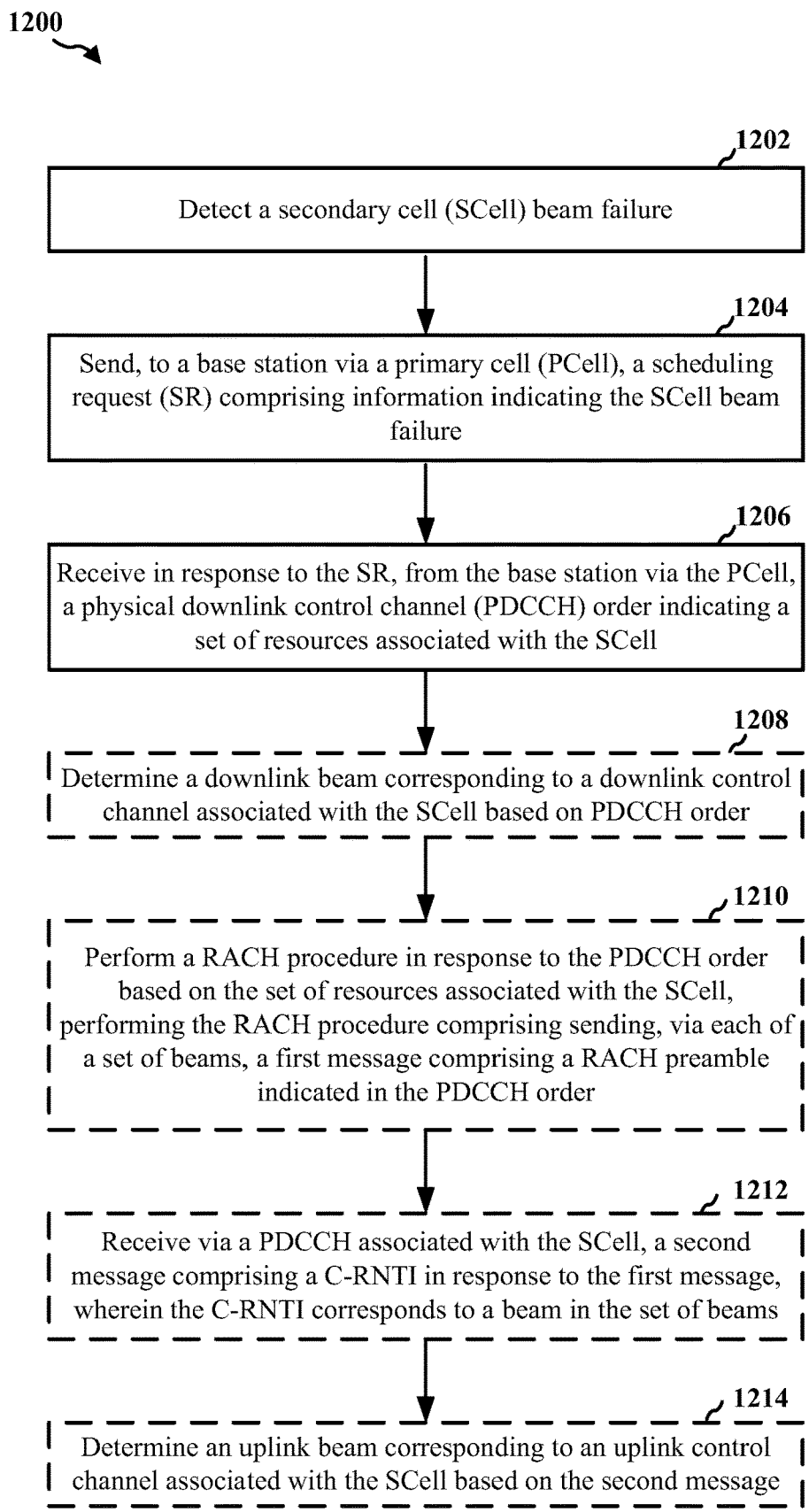

FIG. 12 is a flowchart 1200 of another example method of wireless communication related to SCell beam failure recovery with PCell assistance. The method may be performed by a UE (e.g., the UE 104, 350, 404, 504, 1302/1302', 1750; the UE SCell beam recovery component 198; the processing system 1414, which may include memory 360 and which may be the entire UE 350 or a component of the UE 350, such as the RC processor 356, the TX processor 368, and/or the controller/processor 359). The method may improve beam recovery procedures. Optional aspects are illustrated with a dashed line.

At 1202, the UE may detect a secondary cell (SCell) beam failure. For example, as discussed supra (e.g., in connection with FIG. 8 and elsewhere), the UE 504 may determine that RSRP corresponding to one or more beams of the SCell has fallen below a threshold, and may consider such a condition as an SCell beam failure. For example, the beam failure determination component 1306 of apparatus 1302 may detect the SCell beam failure.

At 1204, the UE may send, to a base station via a primary cell (PCell), a special SR including information indicating the SCell beam failure. For example, as discussed supra in connection with FIG. 8, detection of an SCell beam failure may trigger a beam failure recovery process, and the UE (e.g., UE 504) may send a specially configured SR to the base station 502 to indicate the SCell beam failure as discussed with regard to 812. For example, the SR component 1308 of apparatus 1302 may trigger the sending of the special SR in response to the detection of the SCell beam failure.

At 1206, the UE may receive, via the PCell and in response to the special SR, a physical downlink control channel (PDCCH) order indicating a set of resources associated with the SCell. For example, with reference to FIG. 8, in response to the transmitted special SR, the UE 504 may receive the special PDCCH order over the PCell from the base station 502. The PDCCH order may include one or more of beam identifiers (IDs) corresponding to a set of beams, preamble indices for a RACH procedure, and information indicating a set of resources (e.g., for monitoring/search of various downlink beams, resources for sending PRACH, etc.). For example, the PDCCH component 1320 of apparatus 1302 may receive the PDCCH order.

At 1208, the UE may determine a downlink beam corresponding to a downlink control channel associated with the SCell based on the information received in the PDCCH order. For example, with reference to FIG. 8 example process, the UE 504 may monitor for downlink beams, perform measurements to determine a quality metric (e.g., RSRSP/RSRQ/SINR etc.) for the monitored beams, and identify one or more downlink beams that are best suited for downlink reception (e.g., based on the measurements). For example, the beam determination component 1318 of apparatus 1302 may determine the downlink beam.

At 1210, the UE may perform a RACH procedure in response to the PDCCH order based on the set of resources associated with the SCell, wherein the performing the RACH procedure may comprise sending, via each of a set of beams, a first message comprising a RACH preamble indicated in the PDCCH order. Thus, in some configurations, the UE 504 may transmit RACH preambles via various beams based on the PDCCH order. In some configurations, the UE 504 may transmit RACH preambles via the one or more beams that have been identified earlier to correspond to the best receive direction. For example, the UE 504 may transmit a first message via the same beam that has been identified as the preferred downlink beam. For example, the RACH component 1322 of apparatus 1302 may perform the RACH procedure.

At 1212, the UE may receive a second message comprising a C-RNTI in response to the first message via a PDCCH associated with the SCell, wherein the C-RNTI may correspond to a beam in the set of beams. For example, the C-RNTI in the received PDCCH may map to beam ID corresponding to a beam via which a RACH preamble was earlier transmitted by the UE 504. For example, the PDCCH component 1320 may receive the second message comprising the C-RNTI.

At 1214, the UE may determining an uplink beam corresponding to an uplink control channel associated with the SCell based on the second message. For example, with reference to FIG. 8, the UE 504 may determine the optimal uplink beam associated with the SCell based on the PDCCH with the C-RNTI from the base station 502. For example, the beam determination component 1318 may determine the uplink beam.

Figure 13:
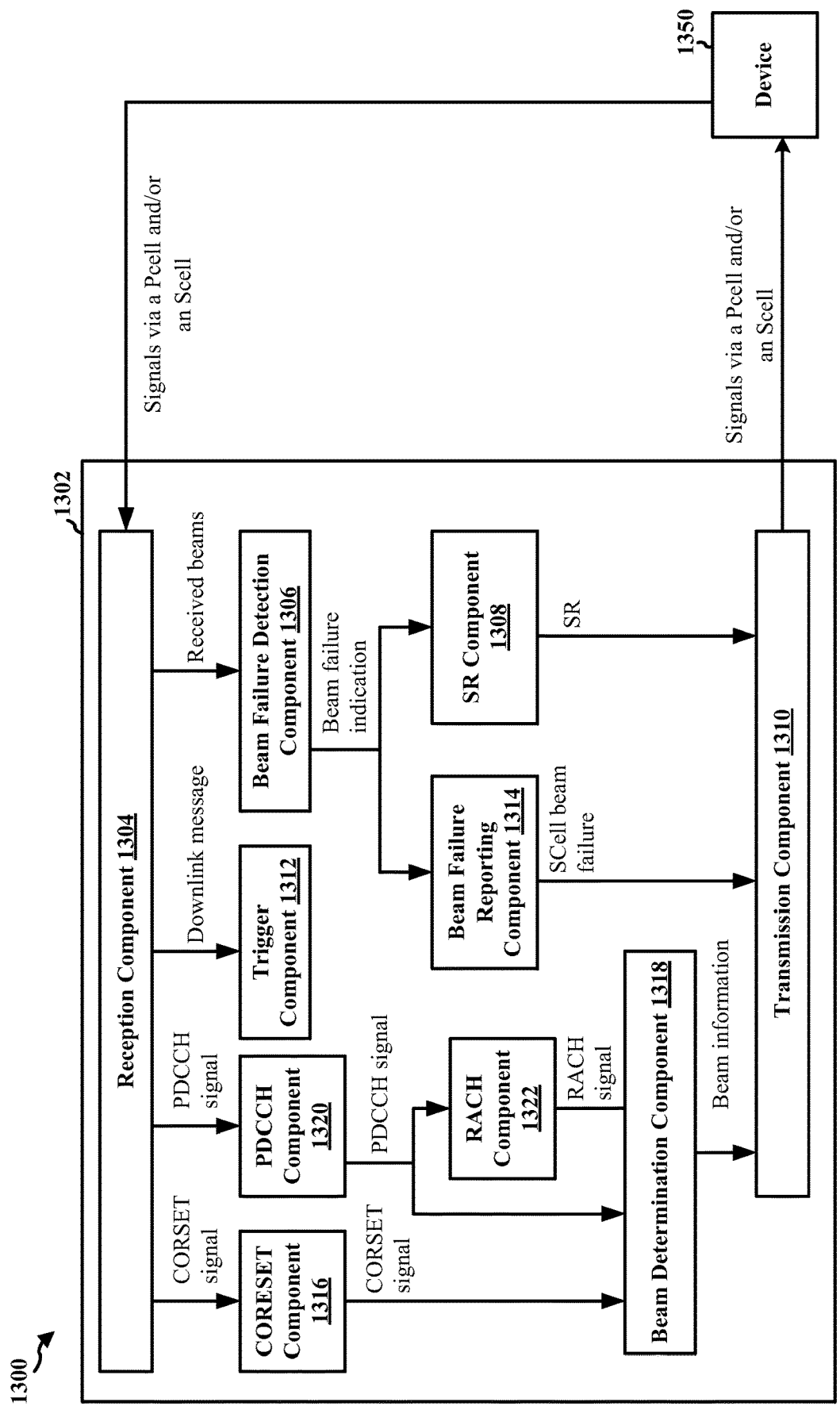
FIG. 13 is a conceptual data flow diagram illustrating the data flow between different means/components in an example apparatus.

FIG. 13 is a conceptual data flow diagram 1300 illustrating the data flow between different means/components in an example apparatus 1302 in communication with a device 1350. The apparatus may be a UE. The apparatus may perform the method of flowcharts 1000, 1100, and/or 1200. In one configuration, the apparatus 1302 may include a reception component 1304, a beam failure detection component 1306, an SR component 1308, a transmission component 1310, a trigger component 1312, a beam failure reporting component 1314, a CORESET component 1316, a beam determination component 1318, a PDCCH component 1320, and a RACH component 1322. The apparatus 1302 may include additional components that may perform one or more additional operations/functions discussed supra in connection with FIGS. 5 to 12. The device 1350 (e.g., a base station) may include the same or similar components as shown with respect to the apparatus 1302 and discussed below in connection with FIGS. 17 and/or 18. It should be appreciated that in other examples, the apparatus 1302 may be a base station and the device 1350 may be a UE.

The reception component 1304 may be configured to receive various types of signals/messages and/or other information from other devices including device 1350. The messages/information may be received via the reception component 1304 and provided to one or more components of the apparatus 1302 for further processing and use in performing various operations.

The beam failure detection component 1306 may be configured to determine an SCell beam failure and trigger a beam failure recovery mechanism (e.g., as described in connection with any of 1002, 1102, and/or 1202).

The SR component 1308 may be configured to trigger the sending of the SR in response to the detection of the SCell beam failure (e.g., as described in connection with any of 1004, 1104, and/or 1204).

The transmission component 1310 may be configured to transmit signals to one or more external devices including, e.g., the device 1350, in accordance with the aspects described herein. In various configurations, the signals and/or information may be transmitted by the transmission component 1310 in accordance with the methods discussed supra including the methods of flowcharts of FIGS. 10 to 12.

The trigger component 1312 may be configured to receive signal(s), including the first message including an UL grant or a trigger for an UL report, via the PCell (e.g., as described in connection with any of 1006 and/or 1106).

The beam failure reporting component 1314 may be configured to cause the sending of a message including information indicating the SCell beam failure (e.g., as described in connection with any of 1008 and/or 1108).

The CORESET component 1316 may be configured to receive and process CORESET signals, such as the SCell CORESET TCI state activation signal (e.g., as described in connection with any of 1010 and/or 1110).

The beam determination component 1318 may be configured to determine a preferred candidate beam, the control channel associated with the preferred candidate beam, the downlink channel associated with the preferred candidate beam, the uplink beam associated with the SCell, the downlink beam corresponding to the downlink control channel associated with the SCell, and/or the uplink beam corresponding to the uplink control channel associated with the SCell (e.g., as described in connection with any of 1012, 1112, 1118, 1208, and/or 1214).

The PDCCH component 1320 may be configured to receive the PDCCH order and/or the C-RNTI (e.g., as described in connection with any of 1114, 1206, and/or 1212).

The RACH component 1322 may be configured to perform the RACH procedure (e.g., as described in connection with any of 1116 and/or 1210).

The apparatus may include additional components that perform each of the blocks of the algorithm in the aforementioned flowcharts of FIGS. 10 to 12. As such, each block in the aforementioned flowcharts of FIGS. 10 to 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
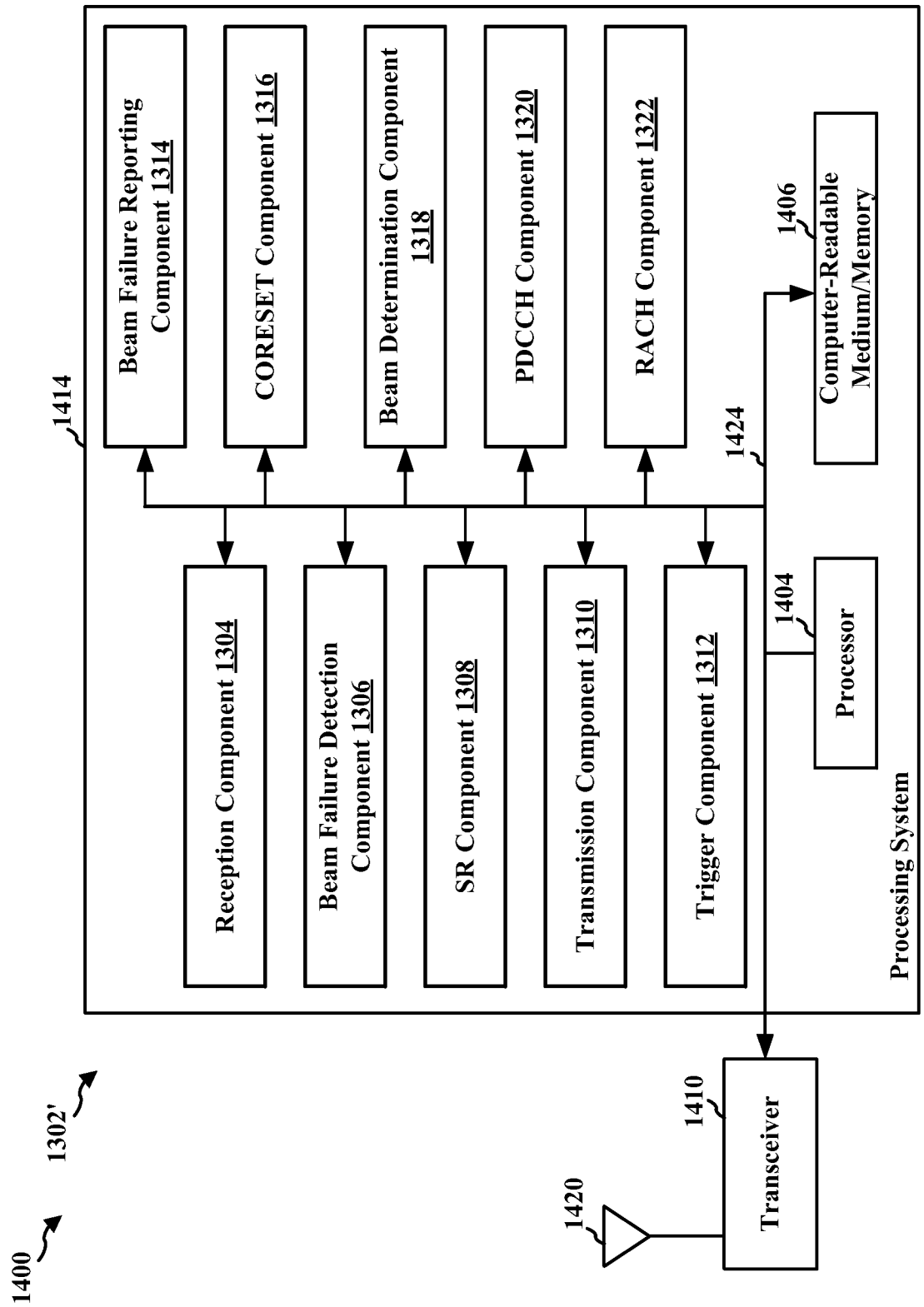
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318, 1320, 1322, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318, 1320, 1322. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359. Alternatively, the processing system 1414 may be the entire UE (e.g., see 350 of FIG. 3).

In one configuration, the apparatus 1302/1302' for wireless communication includes means for detecting a secondary cell (SCell) beam failure; means for sending, to a base station via a primary cell (PCell), a scheduling request (SR) in response to detection of the SCell beam failure; means for receiving, from the base station via the PCell, a first message including one of an uplink (UL) grant or a trigger for an UL report; means for sending a second message, to the base station via the PCell, comprising information indicating the SCell beam failure; means for receiving, from the base station via the PCell, a control resource set (CORESET) transmission configuration indicator (TCI) state activation signal for the preferred candidate beam associated with the SCell; means for determining, based on the CORESET TCI state activation signal, a control channel associated with the preferred candidate beam for communicating with the base station; means for receiving, from the base station via the PCell, a control resource set (CORESET) transmission configuration indicator (TCI) state activation signal indicating activation of a set of resources associated with the SCell; means for determining a downlink beam associated with the SCell based on the set of resources associated with the SCell; means for receiving, via a downlink control channel associated with the SCell, a physical downlink control channel (PDCCH) order; means for performing a random access channel (RACH) procedure in response to the PDCCH order; means for determining an uplink beam associated with the SCell based on the RACH procedure; means for performing the RACH procedure based on the set of resources associated with the SCell; means for determining the uplink beam associated with the SCell based on a confirmation message from the base station; means for communicating with the PCell using a sub-6 GHz frequency band; means for communicating with the SCell using a Millimeter Wave (mmW) frequency band; means for detecting a secondary cell (SCell) beam failure; means for sending, to a base station via a primary cell (PCell), a scheduling request (SR) comprising information indicating the SCell beam failure; means for receiving in response to the SR, from the base station via the PCell, a physical downlink control channel (PDCCH) order indicating a set of resources associated with the SCell; means for determining a downlink beam corresponding to a downlink control channel associated with the SCell based on PDCCH order; means for performing the RACH procedure in response to the PDCCH order based on the set of resources associated with the SCell, wherein the performing the RACH procedure comprises sending, via each of a set of beams, a first message comprising a RACH preamble indicated in the PDCCH order; means for receiving, from the base station via a PDCCH associated with the SCell, a second message comprising a Cell-Radio Network Temporary Identifier (C-RNTI) in response to the first message, wherein the C-RNTI corresponds to a beam in the set of beams; and means for determining an uplink beam corresponding to an uplink control channel associated with the SCell based on the second message. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and/or the controller/processor 359. As such, in one configuration, the aforementioned means may be the TX Processor 368, the RX Processor 356, and/or the controller/processor 359 configured to perform the functions recited by the aforementioned means. Alternatively, the processing system 1414 may be the entire UE (e.g., see the UE 350 of FIG. 3).

Figure 15:
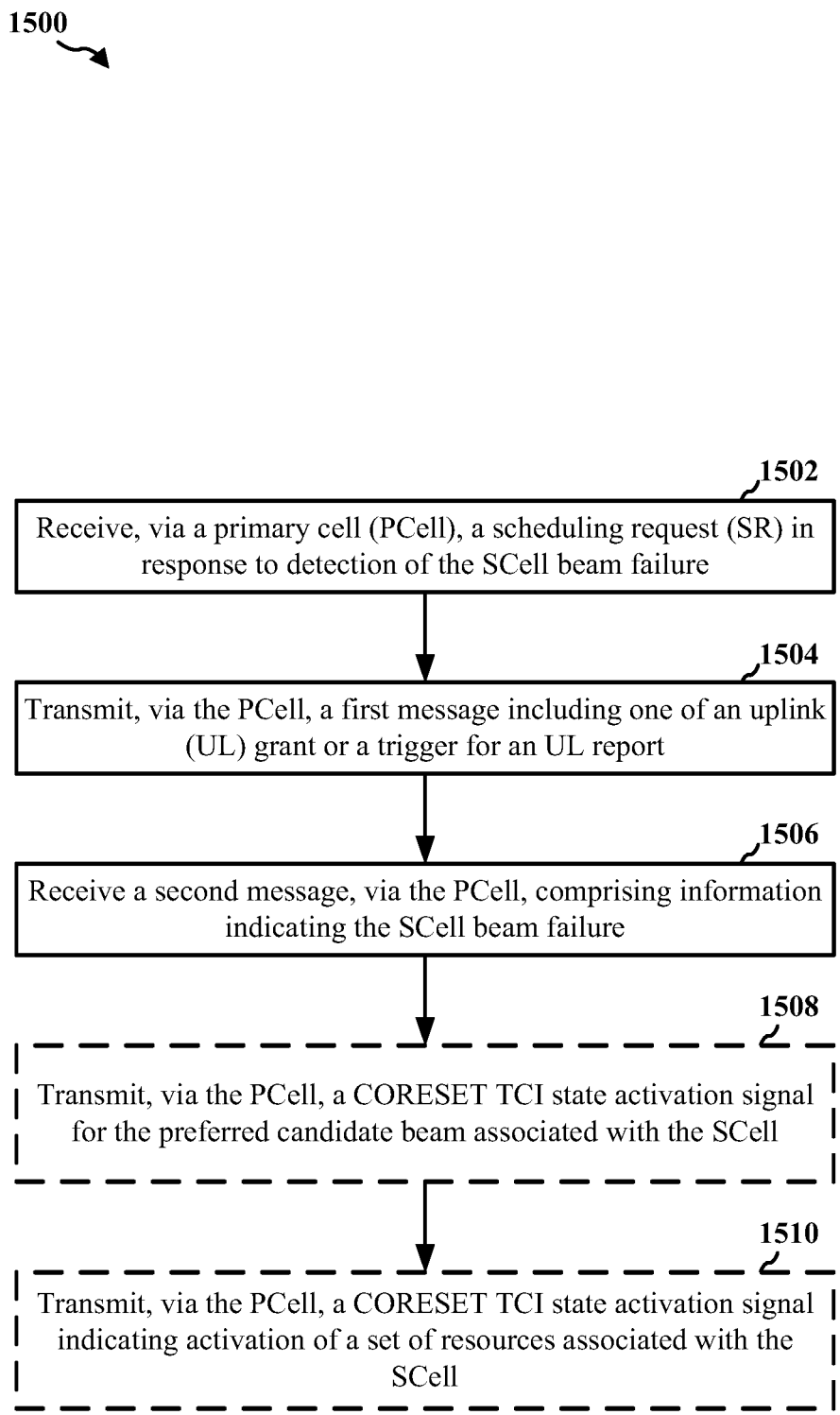
FIGS. 15 and 16 are flowcharts of example methods of wireless communication.

FIG. 15 is a method 1500 of wireless communication. The method may be performed by a base station (e.g., the base station 102, 180, 310, 402, 502, 1702/1702', 1350; the base station SCell beam recovery component 199; the processing system 1414, which may include memory 376 and which may be the entire base station 310 or a component of the base station 310, such as the TX processor 316, the RX processor 370, and/or the controller/processor 375). The method may improve beam recovery procedures. Optional aspects are illustrated with a dashed line.

At 1502, the base station receives, via a PCell, an SR from a UE based on detection of a SCell beam failure at the UE. For example, SR component 1706 of apparatus 1702 may receive the SR from the UE.

At 1504, the base station transmits, from the PCell, a first message to the UE including one of an uplink grant or a trigger for an UL report. For example, trigger component 1708 of apparatus 1702 may cause the apparatus 1702 to send the first message including one of an uplink grant or a trigger for an UL report.

At 1506, the base station receives, at the PCell, a second message from the UE comprising information indicating the SCell beam failure. The second message may comprise one of a MAC-CE or an UL report. The second message may further identify a preferred candidate beam associated with the SCell. For example, beam failure component 1710 of apparatus 1702 may receive the message comprising information indicating the SCell beam failure. In this example, at 1508, the base station may transmit, from the PCell, a CORESET TCI state activation signal for the preferred candidate beam associated with the SCell. The CORESET TCI state activation signal may indicate that resources for the control channel associated with the preferred candidate beam have been activated by the base station. The control channel may be used for both uplink and downlink control transmissions. For example, CORESET component 1712 of apparatus 1702 may cause the apparatus 1702 to transmit the CORESET TCI state activation signal for the preferred candidate beam associated with the SCell.

As illustrated at 1510, the base station may transmit, from the PCell, a CORESET TCI state activation signal indicating activation of a set of resources associated with the SCell. The CORESET TCI state activation signal may indicate the set resources associated with the SCell. For example, CORESET component 1712 of apparatus 1702 may cause the apparatus 1702 to transmit the CORESET TCI state activation signal indicating activation of a set of resources associated with the SCell.

In an example in which the SCell is provided at the base station, the base station may further transmit, via a downlink control channel associated with the SCell, a PDCCH order. For example, PDCCH component 1714 of apparatus 1702 may cause the apparatus 1702 to transmit the PDCCH order. The base station may receive, via the SCell, a RACH message in response to the PDCCH order, wherein an uplink beam associated with the SCell is determined by the UE based on a RACH procedure with the SCell. In other examples, SCell may be at a different base station and such a transmission and reception via the SCell may occur from a different base station. The RACH procedure may be performed based on the set of resources associated with the SCell. For example, RACH component 1716 of apparatus 1702 may perform the RACH procedure. The base station may transmit a confirmation message to the UE, wherein the uplink beam associated with the SCell is determined by the UE based on the confirmation message from the base station. For example, confirmation component 1718 of apparatus 1702 may cause the apparatus 1702 to transmit the confirmation message.

The PCell may communicate with the UE using a sub-6 GHz frequency band and the SCell may communicate with the UE using a mmW frequency band.

Figure 16:
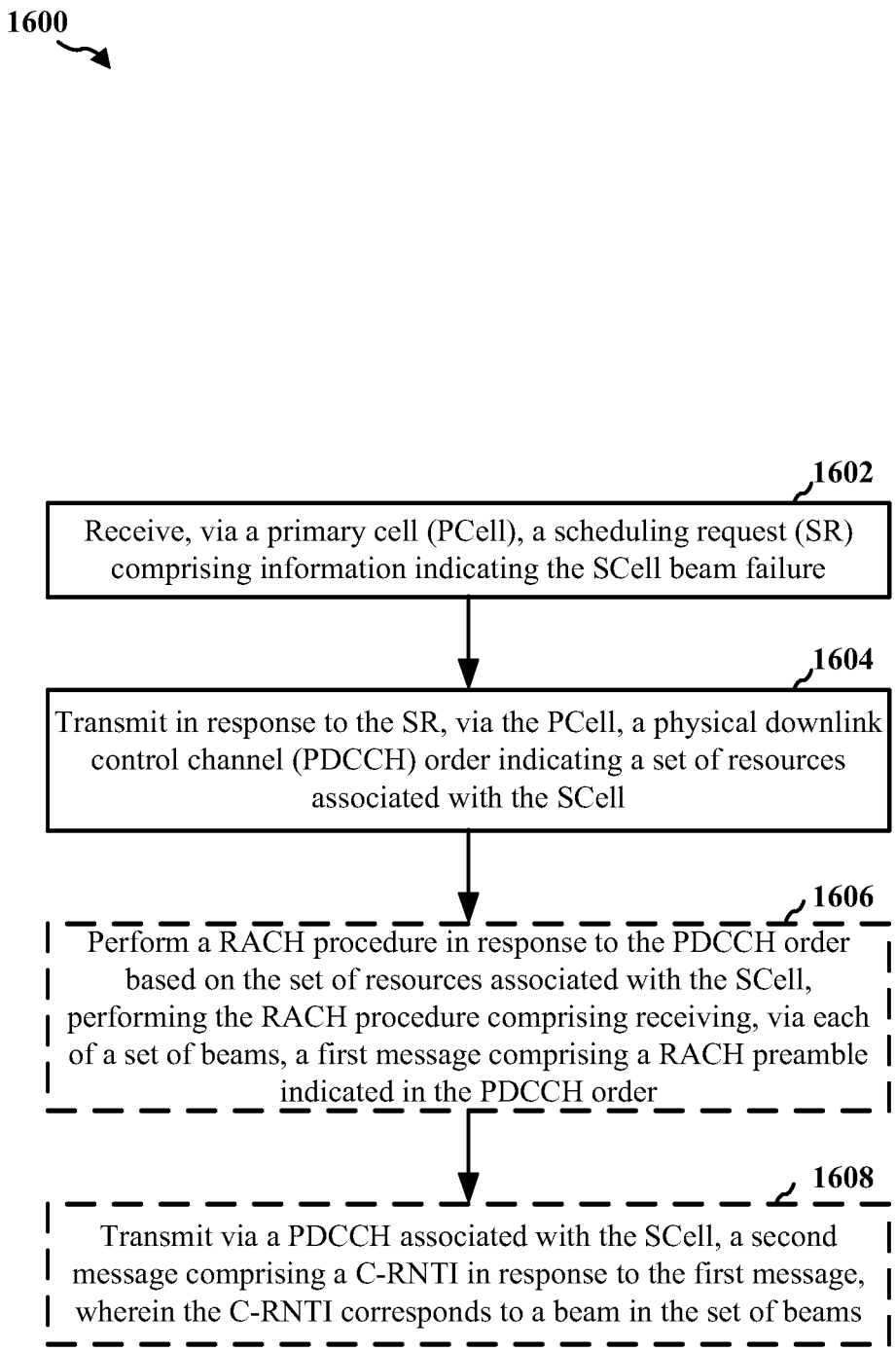

FIG. 16 is a method 1600 of wireless communication. The method may be performed by a base station (e.g., the base station 102, 180, 310, 402, 502, 1702/1702', 1350; the base station SCell beam recovery component 199; the processing system 1414, which may include memory 376 and which may be the entire base station 310 or a component of the base station 310, such as the TX processor 316, the RX processor 370, and/or the controller/processor 375). The method may improve beam recovery procedures. Optional aspects are illustrated with a dashed line.

At 1602, the base station receives, via a PCell, a SR from a UE comprising information indicating a SCell beam failure. For example, the SR component 1706 of apparatus 1702 may receive the SR from the UE.

At 1604, the base station transmits, from the PCell, in response to the SR, a PDCCH order indicating a set of resources associated with the SCell. The PDCCH order may include one or more of beam identifiers (IDs) corresponding to a set of beams, preamble indices for a RACH procedure, and information indicating a set of resources. The PDCCH order may enable the UE to determine a downlink beam corresponding to a downlink control channel associated with the SCell based on PDCCH order. For example, the PDCCH component 1714 of apparatus 1702 may cause the apparatus 1702 to transmit the PDCCH order.

At 1606, base station may further receive, at the SCell, via each of a set of beams, a first message from the UE comprising a RACH preamble indicated in the PDCCH order, in response to the PDCCH order based on the set of resources associated with the SCell. For example, the RACH component 1716 of apparatus 1702 may receive the RACH preamble.

At 1608, the base station may transmit, via a PDCCH associated with the SCell, a second message comprising a C-RNTI in response to the first message, wherein the C-RNTI corresponds to a beam in the set of beams, wherein the UE determines an uplink beam corresponding to an uplink control channel associated with the SCell based on the second message. For example, the PDCCH component 1714 may cause the apparatus 1702 to transmit the C-RNTI via the PDCCH associated with the SCell. In examples in which the SCell and PCell are provided by different base stations, the performance of PRACH and transmission of PDCCH at 1606, 1608 may be performed by a different base station.

Figure 17:
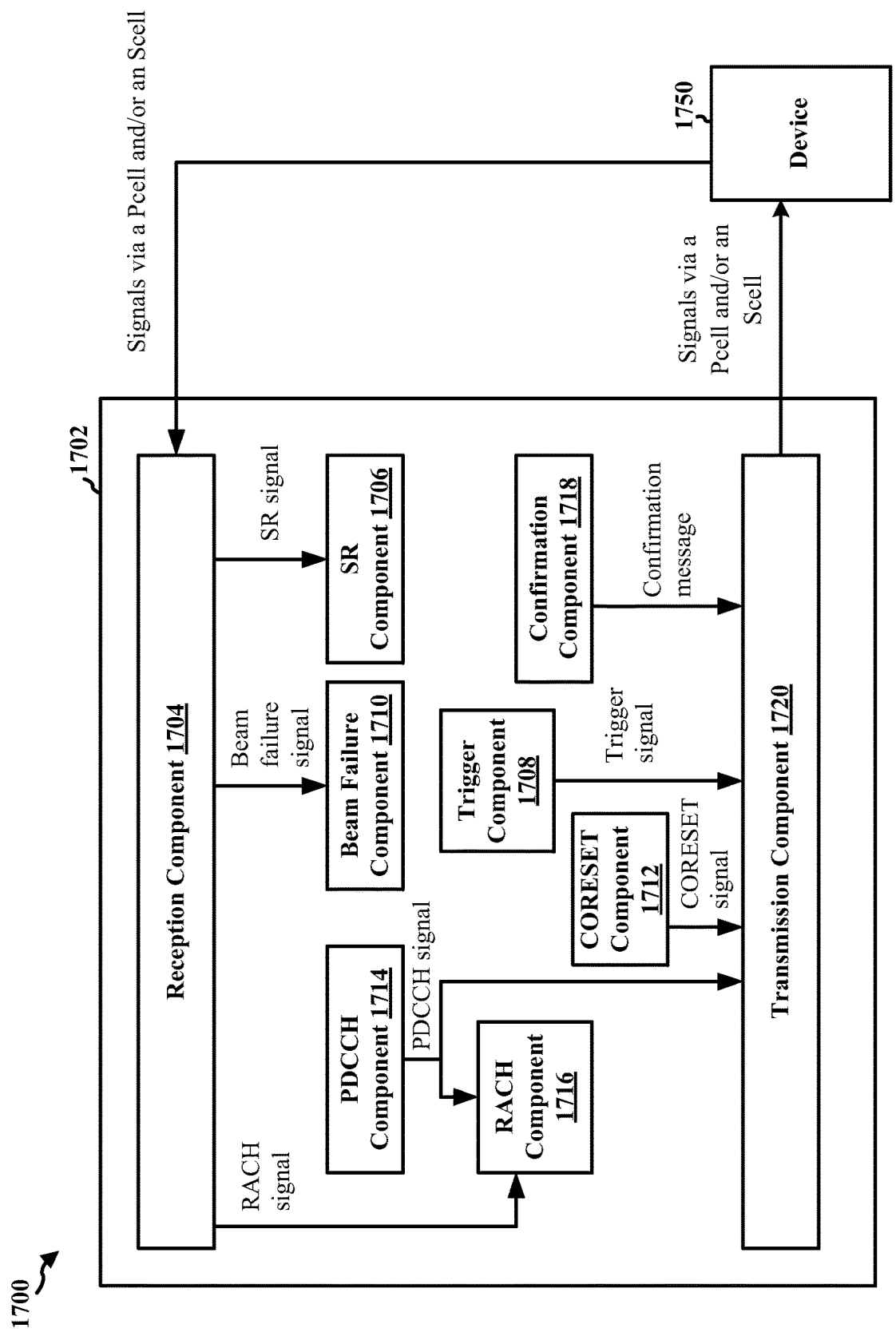
FIG. 17 is a conceptual data flow diagram illustrating the data flow between different means/components in an example apparatus.

FIG. 17 is a conceptual data flow diagram 1700 illustrating the data flow between different means/components in an example apparatus 1702. The apparatus may be a base station. The apparatus includes a reception component 1704, an SR component 1706, a trigger component 1708, a beam failure component 1710, a CORESET component 1712, a PDCCH component 1714, a RACH component 1716, and a confirmation component 1718. The apparatus 1702 may include additional components that may perform one or more additional operations/functions discussed supra in connection with FIGS. 15 and/or 16. The device 1750 (e.g., a UE) may include the same or similar components as shown with respect to the apparatus 1302 and discussed below in connection with FIGS. 5 to 9, 17, and/or 18. It should be appreciated that in other examples, the apparatus 1702 may be a UE and the device 1750 may be a base station.

The reception component 1704 may be configured to receive various types of signals/messages and/or other information from other devices including device 1750. The messages/information may be received via the reception component 1704 and provided to one or more components of the apparatus 1702 for further processing and use in performing various operations.

The SR component 1706 may be configured to receive the SR from the UE (e.g., the device 1750) (e.g., as described in connection with 1502 and/or 1602).

The trigger component 1708 may be configured to cause the sending of the first message including one of an uplink grant or a trigger for an UL report (e.g., as described in connection with 1504).

The beam failure component 1710 may be configured to receive the message comprising information indicating the SCell beam failure (e.g., as described in connection with 1506).

The CORESET component 1712 may be configured to cause the transmitting of CORESET signals, such as the CORESET TCI state activation signal for the preferred candidate beam associated with the SCell, and/or the CORESET TCI state activation signal indicating activation of a set of resources associated with the SCell (e.g., as described in connection with 1508 and/or 1510).

The PDCCH component 1714 may be configured to cause the transmitting of the PDCCH order (e.g., as described in connection with 1604).

The RACH component 1716 may be configured to receive the RACH preamble and/or perform the RACH procedure (e.g., as described in connection with 1606 and/or 1608).

The confirmation component 1718 may be configured to cause the transmitting of a confirmation message to the UE, wherein the uplink beam associated with the SCell is determined by the UE based on the confirmation message from the base station.

The transmission component 1720 may be configured to transmit signals to one or more external devices including, e.g., the device 1750, in accordance with the aspects described herein. In various configurations, the signals and/or information may be transmitted by the transmission component 1720 in accordance with the methods discussed supra including the methods of flowcharts of FIGS. 15 and/or 16.

The apparatus may include additional components that perform each of the blocks of the algorithm in the aforementioned flowcharts of FIGS. 15 and/or 16. As such, each block in the aforementioned flowcharts of FIGS. 15 and/or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
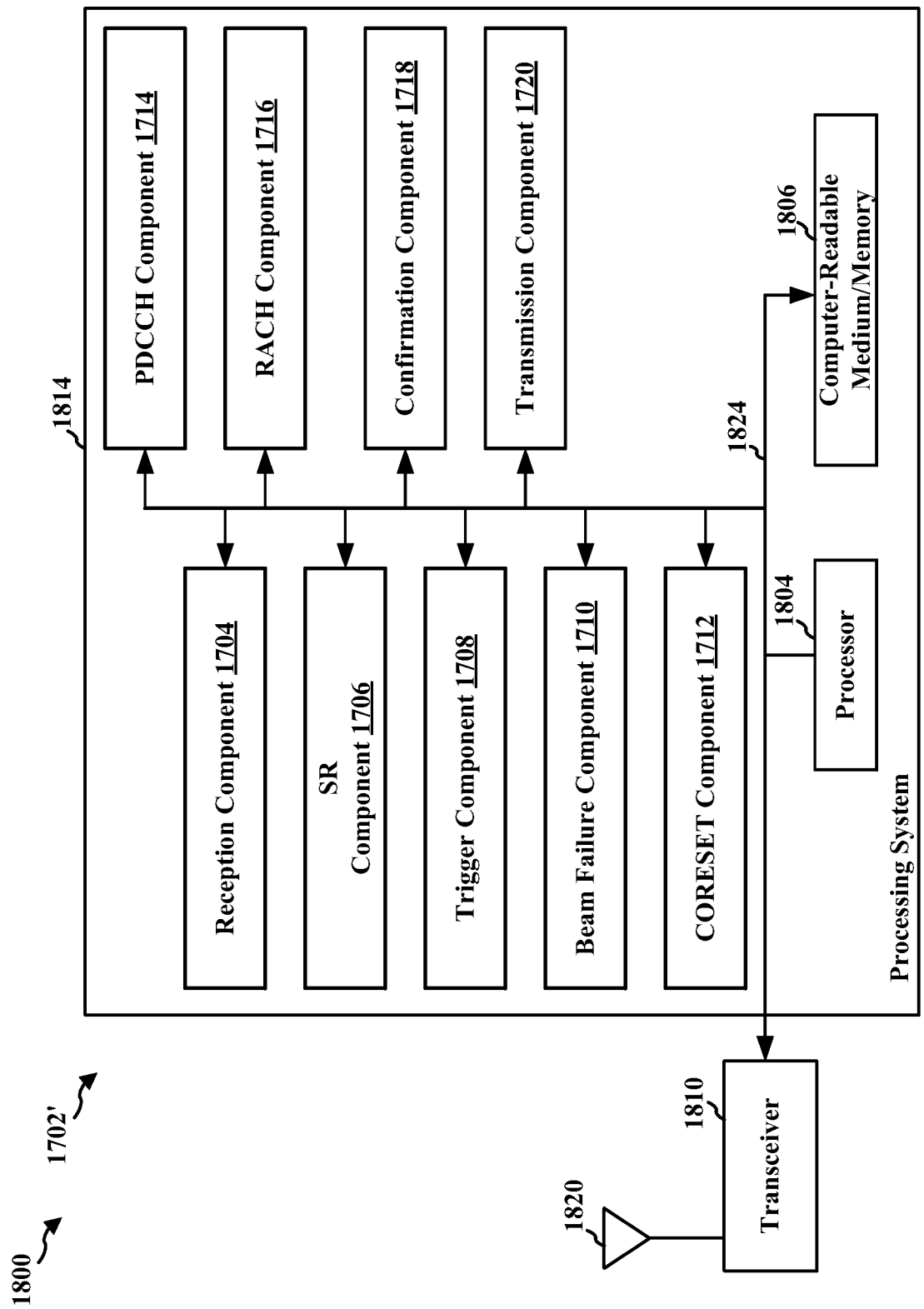
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712, 1714, 1716, 1718, 1720, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1720, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712, 1714, 1716, 1718, 1720. The components may be software components running in the processor 1804, resident/stored in the computer readable medium/memory 1806, one or more hardware components coupled to the processor 1804, or some combination thereof. The processing system 1814 may be a component of the base station 310 and may include the memory 376 and/or at least one of the TX processor 316, the RX processor 370, and the controller/processor 375. Alternatively, the processing system 1814 may be the entire base station (e.g., see 310 of FIG. 3).

In one configuration, the apparatus 1702/1702' for wireless communication includes means for receiving, via a primary cell (PCell), a scheduling request (SR) from a user equipment (UE) based on detection of a secondary cell (SCell) beam failure at the UE; means for transmitting, from the PCell, a first message to the UE including one of an uplink (UL) grant or a trigger for an UL report; means for receiving, at the PCell, a second message from the UE comprising information indicating the SCell beam failure; means for transmitting, from the PCell, a control resource set (CORESET) transmission configuration indicator (TCI) state activation signal for the preferred candidate beam associated with the SCell; means for transmitting, from the PCell, a control resource set (CORESET) transmission configuration indicator (TCI) state activation signal indicating activation of a set of resources associated with the SCell; means for transmitting, via a downlink control channel associated with the SCell, a physical downlink control channel (PDCCH) order; means for receiving, via the SCell, a random access channel (RACH) message in response to the PDCCH order, wherein an uplink beam associated with the SCell is determined by the UE based on a RACH procedure with the SCell; means for performing the RACH procedure based on the set of resources associated with the SCell; means for transmitting a confirmation message to the UE, wherein the uplink beam associated with the SCell is determined by the UE based on the confirmation message from the base station; means for receiving, via a primary cell (PCell), a scheduling request (SR) from a user equipment (UE) comprising information indicating a secondary cell (SCell) beam failure; means for transmitting, from the PCell, in response to the SR, a physical downlink control channel (PDCCH) order indicating a set of resources associated with the SCell; means for receiving, at the SCell, via each of a set of beams, a first message from the UE comprising a RACH preamble indicated in the PDCCH order, in response to the PDCCH order based on the set of resources associated with the SCell; and means for transmitting, via a PDCCH associated with the SCell, a second message comprising a Cell-Radio Network Temporary Identifier (C-RNTI) in response to the first message, wherein the C-RNTI corresponds to a beam in the set of beams, wherein the UE determines an uplink beam corresponding to an uplink control channel associated with the SCell based on the second message. The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. Alternatively, the processing system 1814 may be the entire base station (e.g., the see the base station 310 of FIG. 3).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   detecting a secondary cell (SCell) beam failure;
   sending, to a base station via a primary cell (PCell), a scheduling request (SR) in response to detection of the SCell beam failure;
   receiving, from the base station via the PCell, a first message including a trigger for an UL report; and
   sending, to the base station via the PCell and separate from sending the SR, a second message comprising the UL report indicating the SCell beam failure and a preferred candidate beam associated with a SCell.

2. The method of claim 1, wherein the second message comprises one of a medium access control (MAC) control element (MAC-CE) or the UL report.

3. The method of claim 1, further comprising:
   receiving, from the base station via the PCell, a control resource set (CORESET) transmission configuration indicator (TCI) state activation signal for the preferred candidate beam associated with the SCell; and
   determining, based on the CORESET TCI state activation signal, a control channel associated with the preferred candidate beam for communicating with the base station.

4. The method of claim 3, wherein the CORESET TCI state activation signal indicates that resources for the control channel associated with the preferred candidate beam have been activated by the base station.

5. The method of claim 3, wherein the control channel is used for both uplink and downlink control transmissions.

6. The method of claim 1, further comprising:
   receiving, from the base station via the PCell, a control resource set (CORESET) transmission configuration indicator (TCI) state activation signal indicating activation of a set of resources associated with the SCell; and
   determining a downlink beam associated with the SCell based on the set of resources associated with the SCell.

7. The method of claim 6, wherein the CORESET TCI state activation signal further indicates activation of control channel resources associated with the SCell.

8. The method of claim 6, further comprising:
   receiving, from the base station via the PCell, a downlink indication that control channel resources corresponding to the SCell are activated for beam recovery;
   receiving, from the base station via the SCell, a physical downlink control channel (PDCCH) order based on the downlink indication;
   performing a random access channel (RACH) procedure in response to the PDCCH order; and
   determining an uplink beam associated with the SCell based on the RACH procedure.

9. The method of claim 8, wherein the RACH procedure is performed based on the set of resources associated with the SCell, and
   wherein the uplink beam associated with the SCell is determined based on a confirmation message from the base station.

10. The method of claim 1, wherein the UE communicates with the PCell using a sub-6 GHz frequency band and communicates with the SCell using a Millimeter Wave (mmW) frequency band.

11. A method of wireless communication at a base station, comprising:
    receiving, via a primary cell (PCell) from a user equipment (UE), a scheduling request (SR) based on detection of a secondary cell (SCell) beam failure at the UE;
    transmitting, from the PCell and in response to receiving the SR, a first message including a trigger for an UL report; and
    receiving, at the PCell from the UE and separate from receiving the SR, a second message comprising the UL report indicating the SCell beam failure and a preferred candidate beam associated with a SCell.

12. The method of claim 11, further comprising:
    transmitting, from the PCell, a control resource set (CORESET) transmission configuration indicator (TCI) state activation signal for the preferred candidate beam associated with the SCell.

13. The method of claim 12, wherein the CORESET TCI state activation signal indicates that resources for a control channel associated with the preferred candidate beam have been activated by the base station.

14. The method of claim 11, further comprising:
    transmitting, from the PCell, a control resource set (CORESET) transmission configuration indicator (TCI) state activation signal comprising a downlink indication that indicates activation of a set of resources associated with the SCell including control channel resources associated with the SCell.

15. The method of claim 14, further comprising:
    transmitting, to the UE via the PCell, a downlink indication that control channel resources corresponding to the SCell are activated for beam recovery;
    transmitting, to the UE via the SCell, a physical downlink control channel (PDCCH) order based on the downlink indication; and
    receiving, from the UE via the SCell, a random access channel (RACH) message in response to the PDCCH order, wherein an uplink beam associated with the SCell is determined by the UE based on a RACH procedure with the SCell.

16. The method of claim 15, wherein the RACH procedure is performed based on the set of resources associated with the SCell, and the method further comprising:
    transmitting a confirmation message to the UE, wherein the uplink beam associated with the SCell is determined by the UE based on the confirmation message from the base station.

17. An apparatus for wireless communication, the apparatus comprising:
    a memory; and
    at least one processor coupled to the memory and configured to:
      detect a secondary cell (SCell) beam failure;
      send, to a base station via a primary cell (PCell), a scheduling request (SR) in response to detection of the SCell beam failure;
      receive, from the base station via the PCell, a first message including a trigger for an UL report; and
      send, to the base station via the PCell and separate from sending the SR, a second message comprising the UL report indicating the SCell beam failure and a preferred candidate beam associated with a SCell.

18. The apparatus of claim 17, wherein the at least one processor is further configured to:
    receive, from the base station via the PCell, a control resource set (CORESET) transmission configuration indicator (TCI) state activation signal for the preferred candidate beam associated with the SCell; and determine, based on the CORESET TCI state activation signal, a control channel associated with the preferred candidate beam for communicating with the base station.

19. The apparatus of claim 17, wherein the at least one processor is further configured to:
receive, from the base station via the PCell, a control resource set (CORESET) transmission configuration indicator (TCI) state activation signal indicating activation of a set of resources associated with the SCell including control channel resources associated with the SCell; and
determine a downlink beam associated with the SCell based on the set of resources associated with the SCell.

20. The apparatus of claim 19, wherein the at least one processor is further configured to:
receive, from the base station via the PCell, a downlink indication that control channel resources corresponding to the SCell are activated for beam recovery;
receive, from the base station via the SCell, a physical downlink control channel (PDCCH) order based on the downlink indication;
perform a random access channel (RACH) procedure in response to the PDCCH order; and
determine an uplink beam associated with the SCell based on the RACH procedure.

21. An apparatus for wireless communication at a base station, the apparatus comprising:
a memory; and
at least one processor coupled to the memory and configured to:
receive, via a primary cell (PCell) from a user equipment (UE), a scheduling request (SR) based on detection of a secondary cell (SCell) beam failure at the UE;
transmit, via the PCell, a first message to the UE including a trigger for an UL report; and
receive, at the PCell from the UE and separate from receiving the SR, a second message comprising the UL report indicating the SCell beam failure and a preferred candidate beam associated with a SCell.

22. The apparatus of claim 21, wherein the at least one processor is further configured to:
transmit, from the PCell, a control resource set (CORESET) transmission configuration indicator (TCI) state activation signal for the preferred candidate beam associated with the SCell.

23. The apparatus of claim 21, wherein the at least one processor is further configured to:
transmit, from the PCell, a control resource set (CORESET) transmission configuration indicator (TCI) state activation signal indicating activation of a set of resources associated with the SCell.

24. The apparatus of claim 23, wherein the at least one processor is further configured to:
transmit, to the UE via the PCell, a downlink indication that control channel resources corresponding to the SCell are activated for beam recovery;
transmit, to the UE via the SCell, a physical downlink control channel (PDCCH) order based on the downlink indication; and
receive, via the SCell, a random access channel (RACH) message in response to the PDCCH order, wherein an uplink beam associated with the SCell is determined by the UE based on a RACH procedure with the SCell.

25. The apparatus of claim 24, wherein the RACH procedure is performed based on the set of resources associated with the SCell, and wherein the at least one processor is further configured to:
transmit a confirmation message to the UE, wherein the uplink beam associated with the SCell is determined by the UE based on the confirmation message from the base station.

* * * * *